United States Patent [19]

Kikuchi

[11] Patent Number: 5,446,590
[45] Date of Patent: Aug. 29, 1995

[54] HIGH EYE POINT TYPE VIEWFINDER OPTICAL SYSTEM

[75] Inventor: Juro Kikuchi, Yamanashi, Japan

[73] Assignee: Olympus Optical Co., Ltd., Tokyo, Japan

[21] Appl. No.: 86,841

[22] Filed: Jul. 7, 1993

[30] Foreign Application Priority Data

Jul. 8, 1992 [JP] Japan .................. 4-203236

[51] Int. Cl.⁶ .................. G02B 25/00; G03B 13/10; G03B 13/08
[52] U.S. Cl. .................. 359/645; 354/222; 354/225
[58] Field of Search .................. 359/643, 644, 645; 354/222, 223, 224, 225

[56] References Cited

U.S. PATENT DOCUMENTS 4,389,097 6/1983 Ohishi .................. 359/643

FOREIGN PATENT DOCUMENTS 54-126530 10/1979 Japan .
56-91210 7/1981 Japan .
56-91210 7/1981 Japan .
59-148021 8/1984 Japan .
61-156017 7/1986 Japan .
64-81925 3/1989 Japan .

Primary Examiner—Scott J. Sugarman
Attorney, Agent, or Firm—Cushman, Darby & Cushman

[57] ABSTRACT

A high eye point type viewfinder optical system comprising an eyepiece lens system for observing an image of an object formed on a reticle, and a pentagonal prism and a condenser lens which are disposed between the reticle and the eyepiece lens system in order from the eyepiece lens system; wherein the eyepiece lens system consists, in order from the side of an eye of a photographer, of a first negative lens component, a second positive lens component and a third lens component. This viewfinder optical system is configured so as to permit adjustment of diopter by moving the second and third lens components along an optical axis with the first lens component kept fixed or moving the second lens component along the optical axis with the first and third lens components kept fixed.

23 Claims, 16 Drawing Sheets

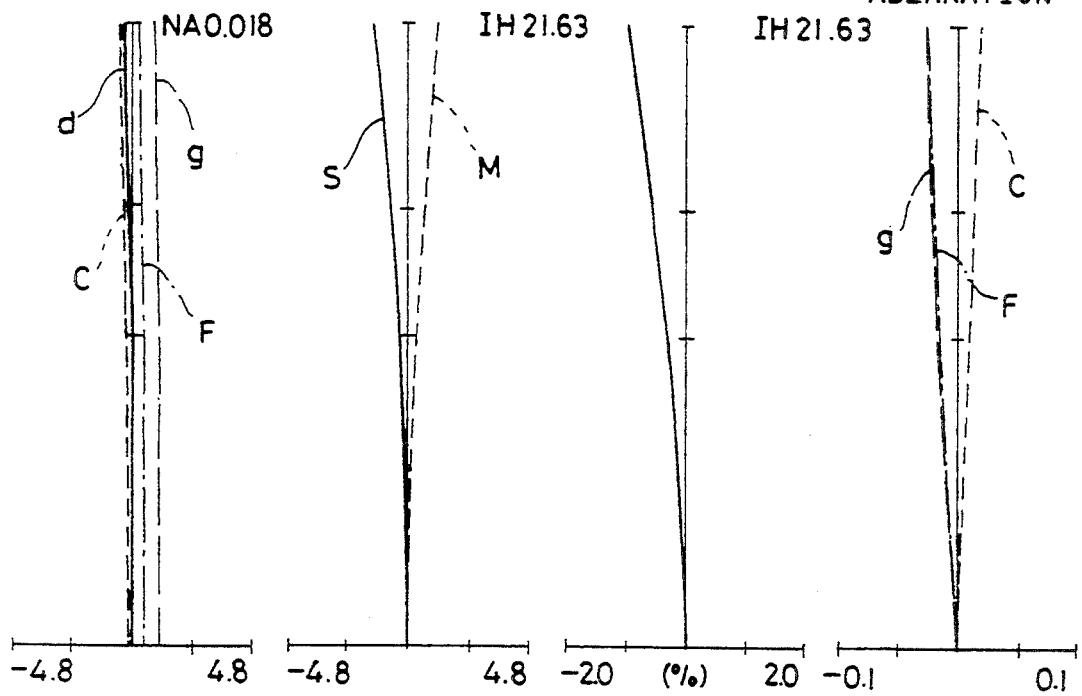
FIG. 2A SPHERICAL ABERRATION
FIG. 2B ASTIGMATISM
FIG. 2C DISTORTION
FIG. 2D LATERAL CHROMATIC ABERRATION
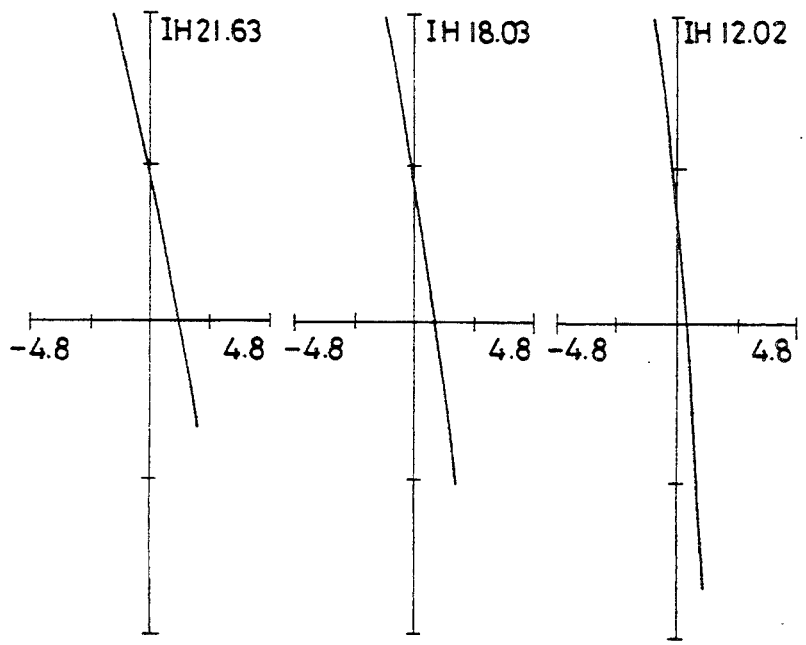
FIG. 2E COMA
FIG. 2F COMA
FIG. 2G COMA

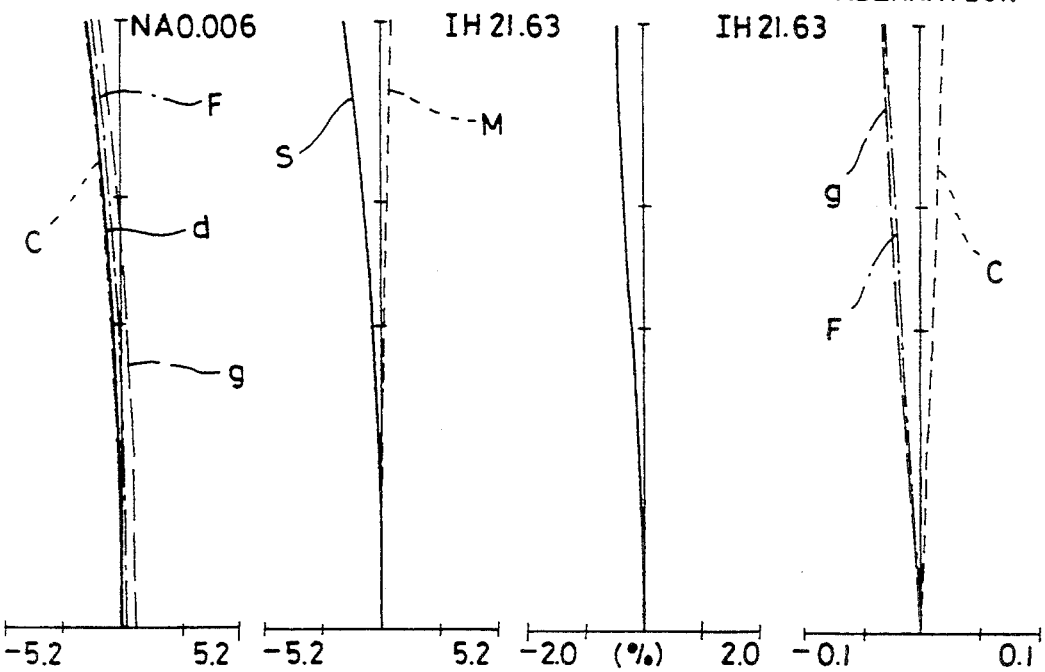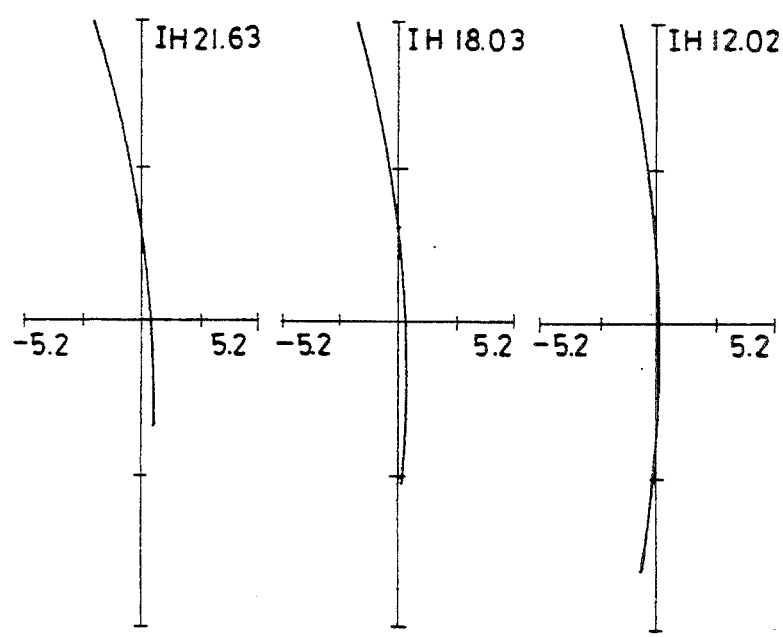

FIG.4A
SPHERICAL ABERRATION
FIG.4B
ASTIGMATISM
FIG.4C
DISTORTION
FIG.4D
LATERAL CHROMATIC ABERRATION
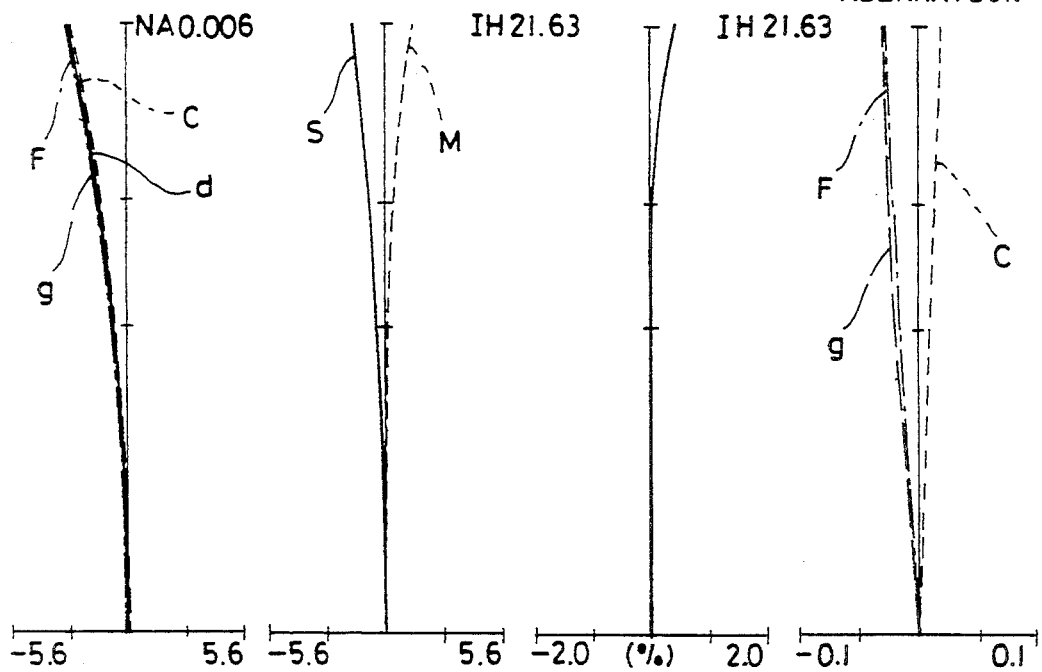
FIG.4E
COMA
FIG.4F
COMA
FIG.4G
COMA
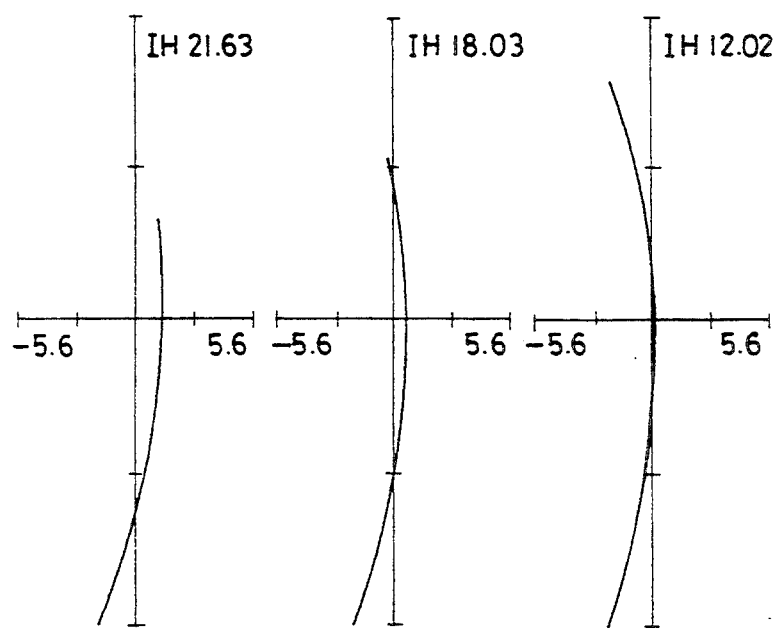

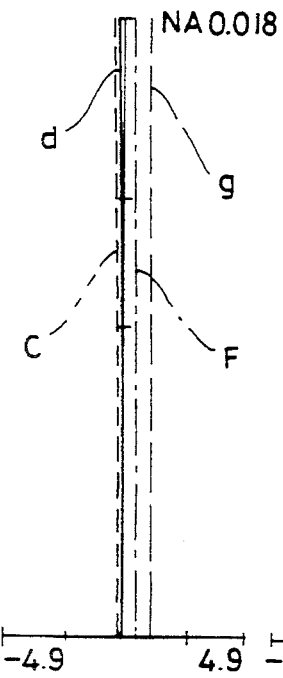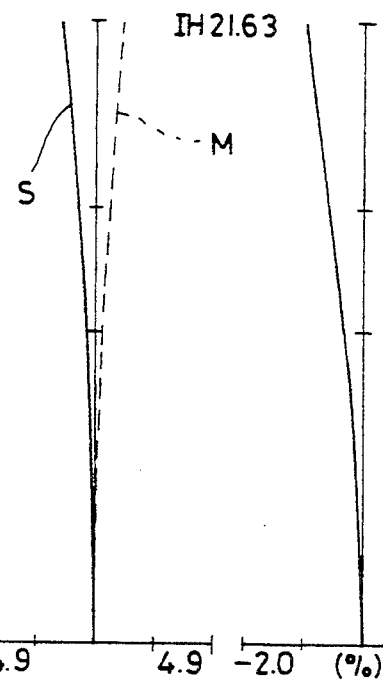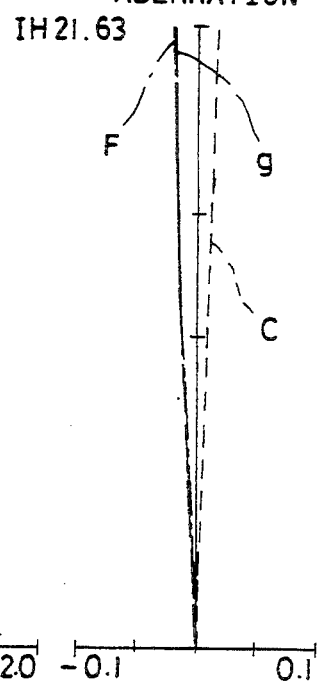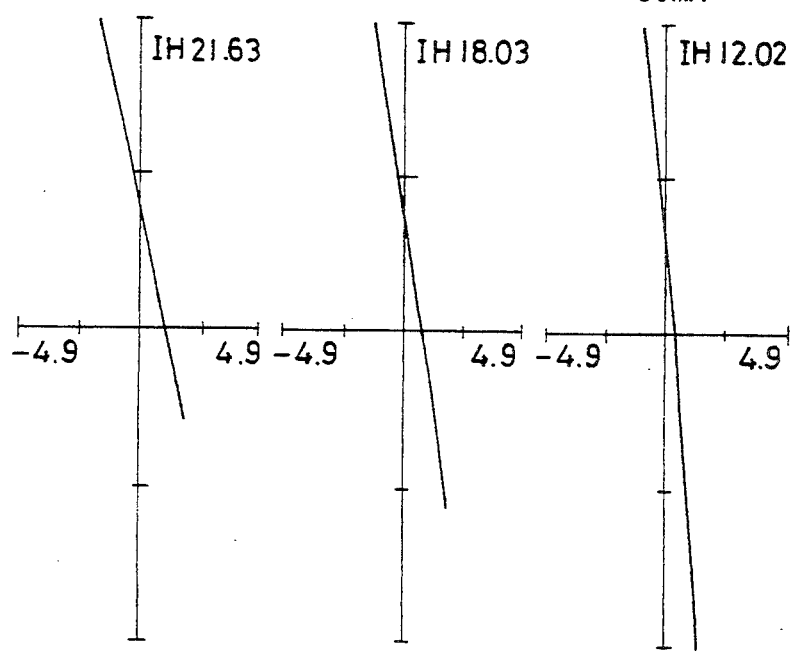

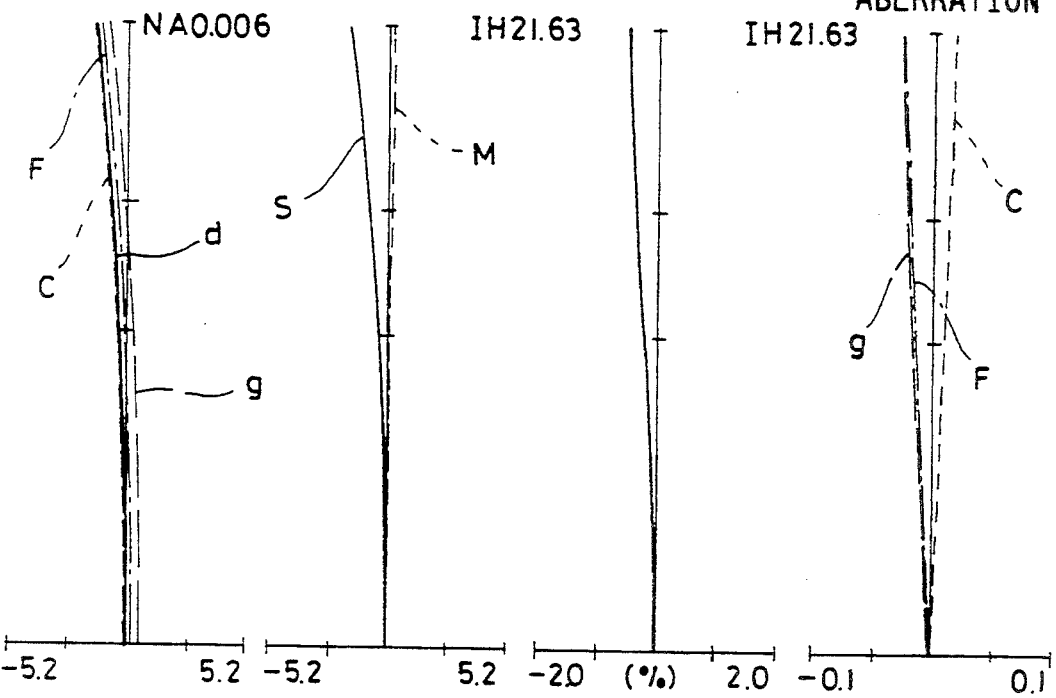
FIG. 6A SPHERICAL ABERRATION
FIG. 6B ASTIGMATISM
FIG. 6C DISTORTION
FIG. 6D LATERAL CHROMATIC ABERRATION
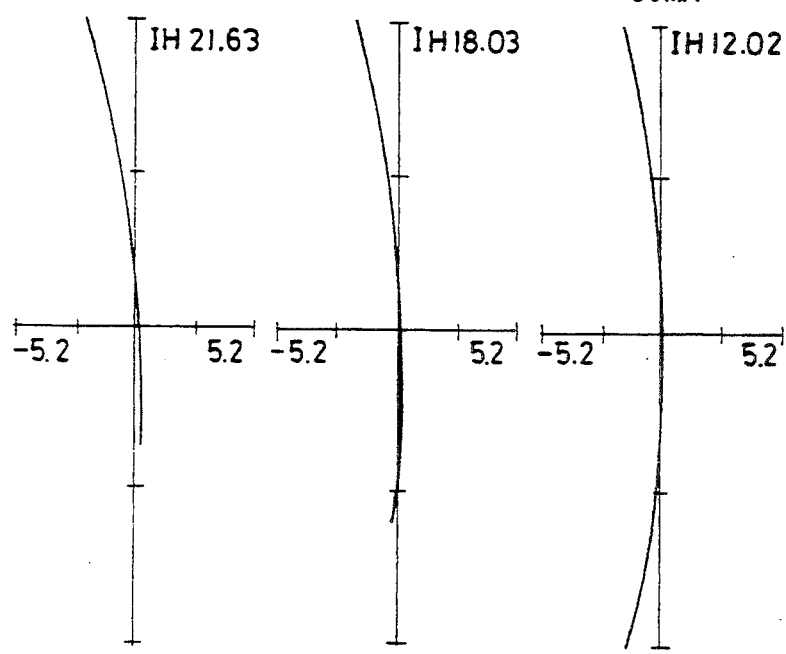
FIG. 6E COMA
FIG. 6F COMA
FIG. 6G COMA

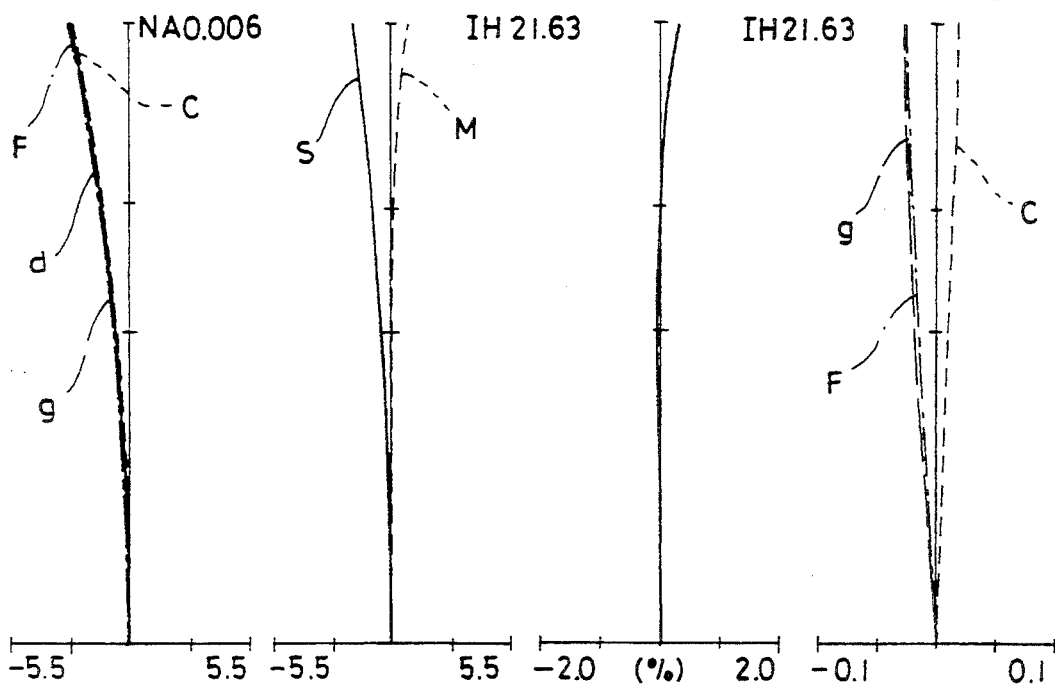
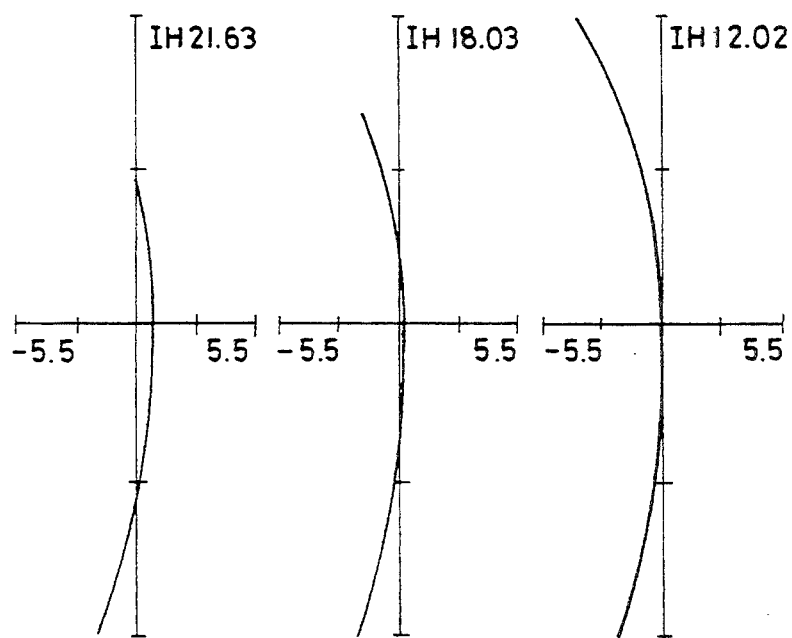

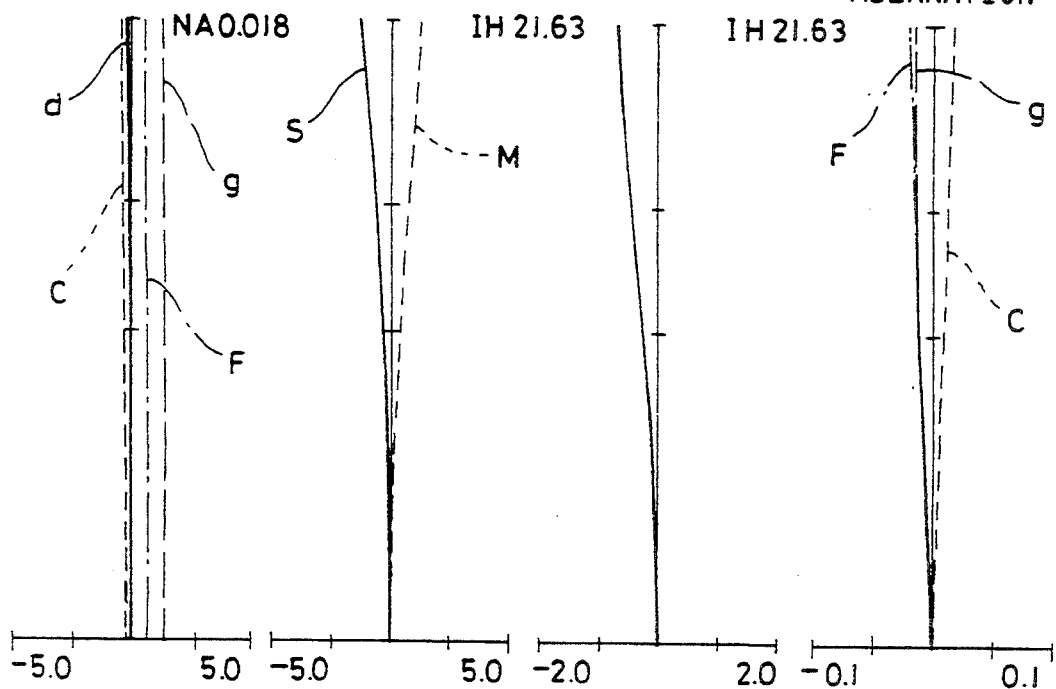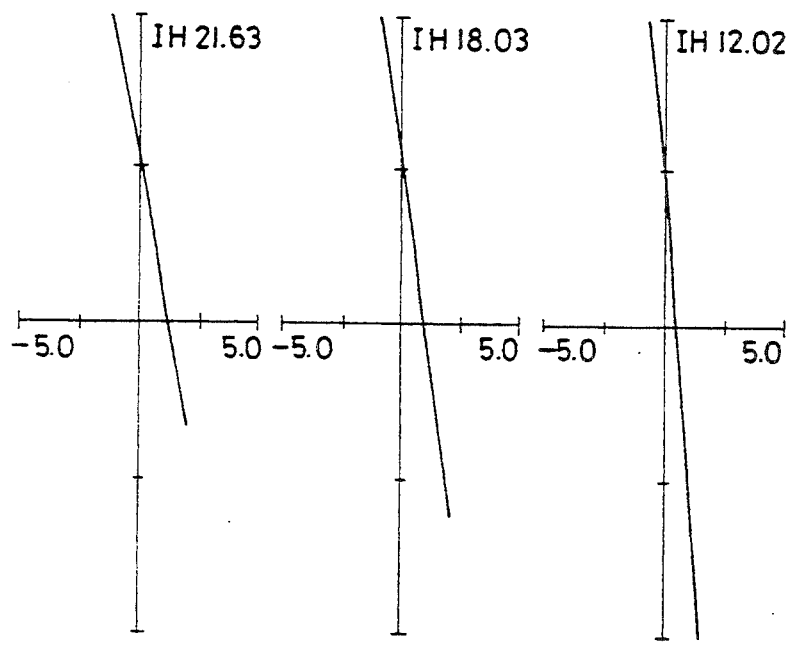

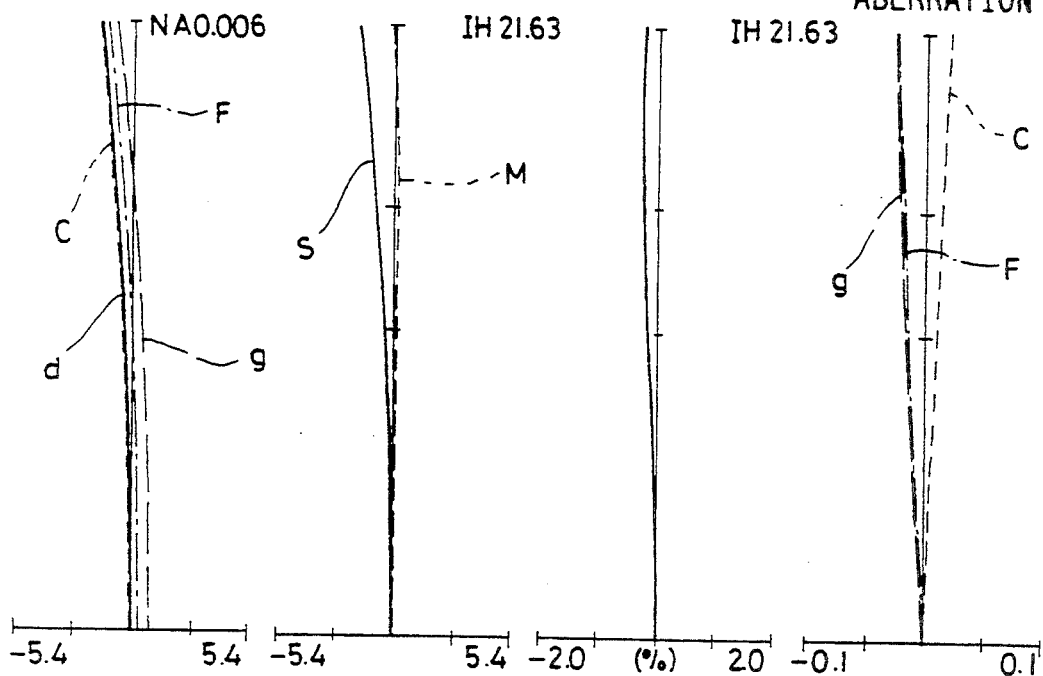

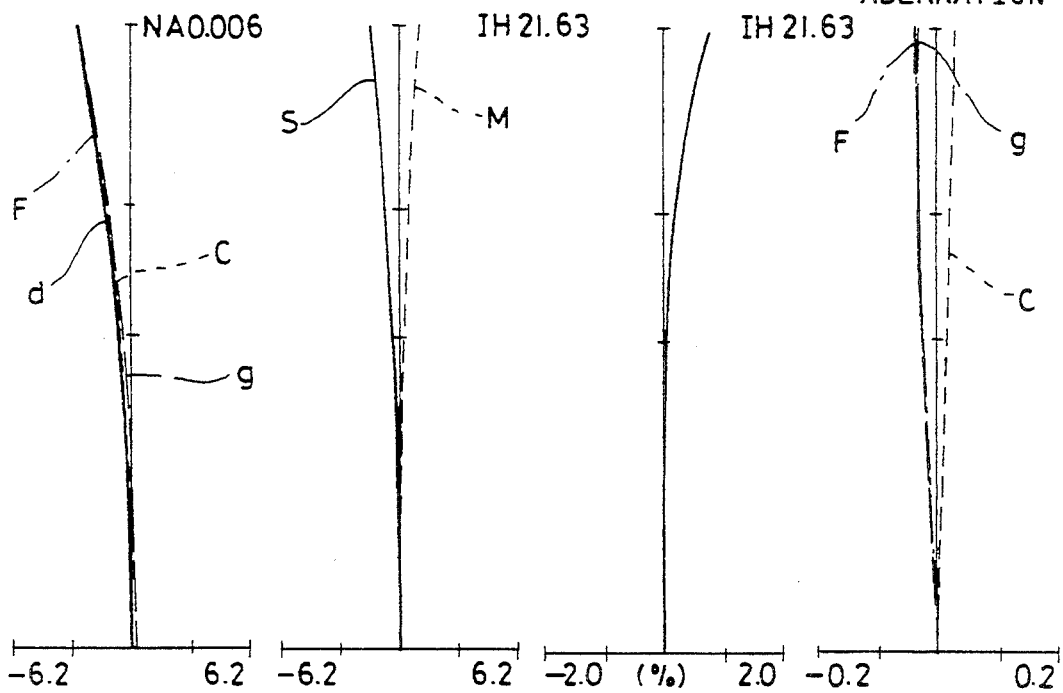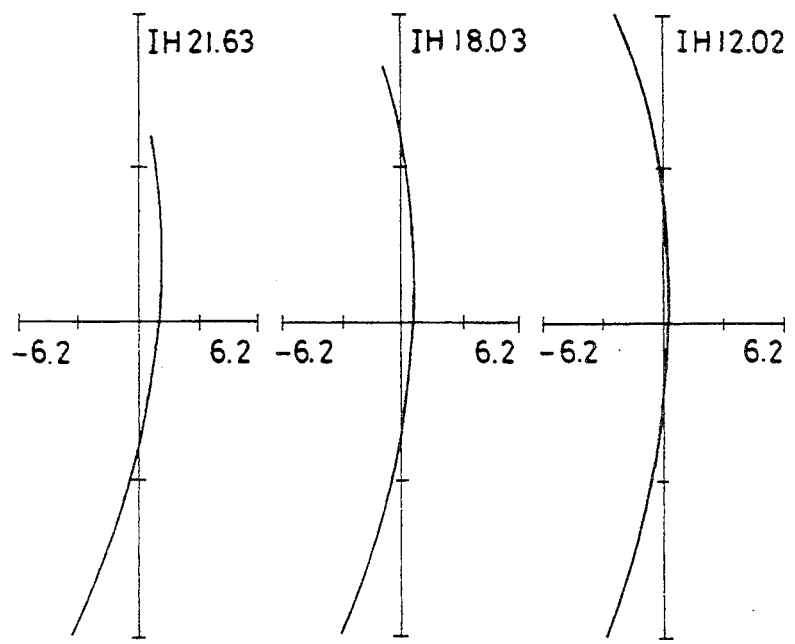

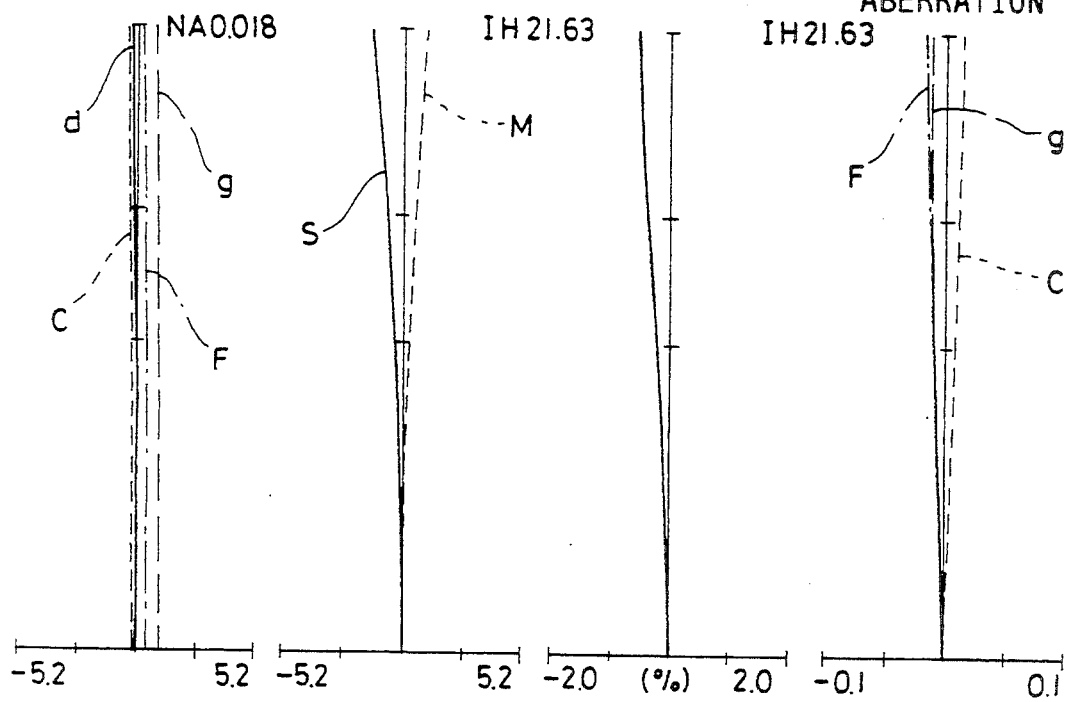# FIG. 11A SPHERICAL ABERRATION
FIG. 11B ASTIGMATISM
FIG. 11C DISTORTION
FIG. 11D LATERAL CHROMATIC ABERRATION
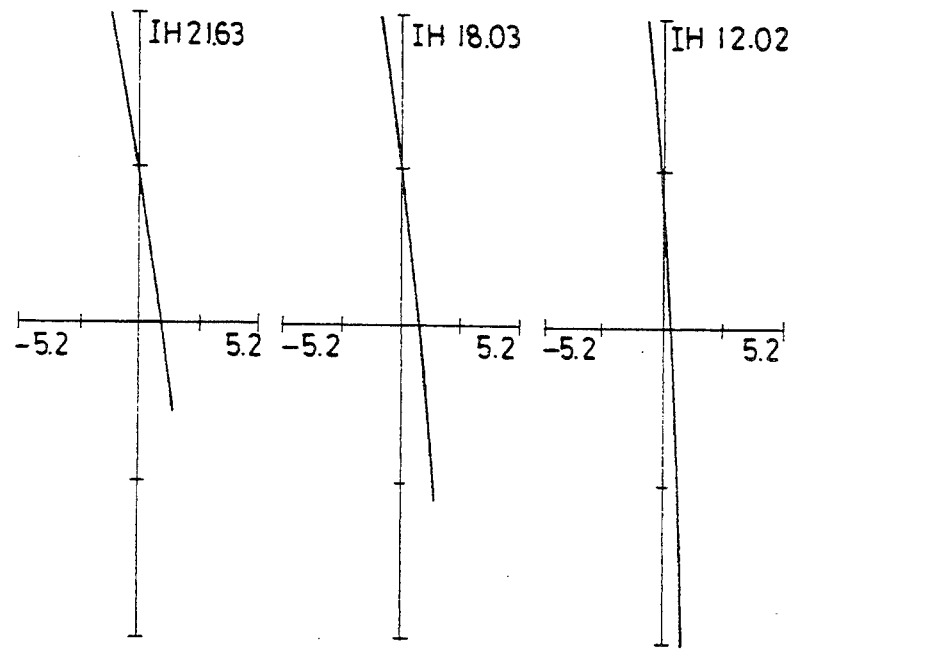# FIG. 11E COMA
FIG. 11F COMA
FIG. 11G COMA

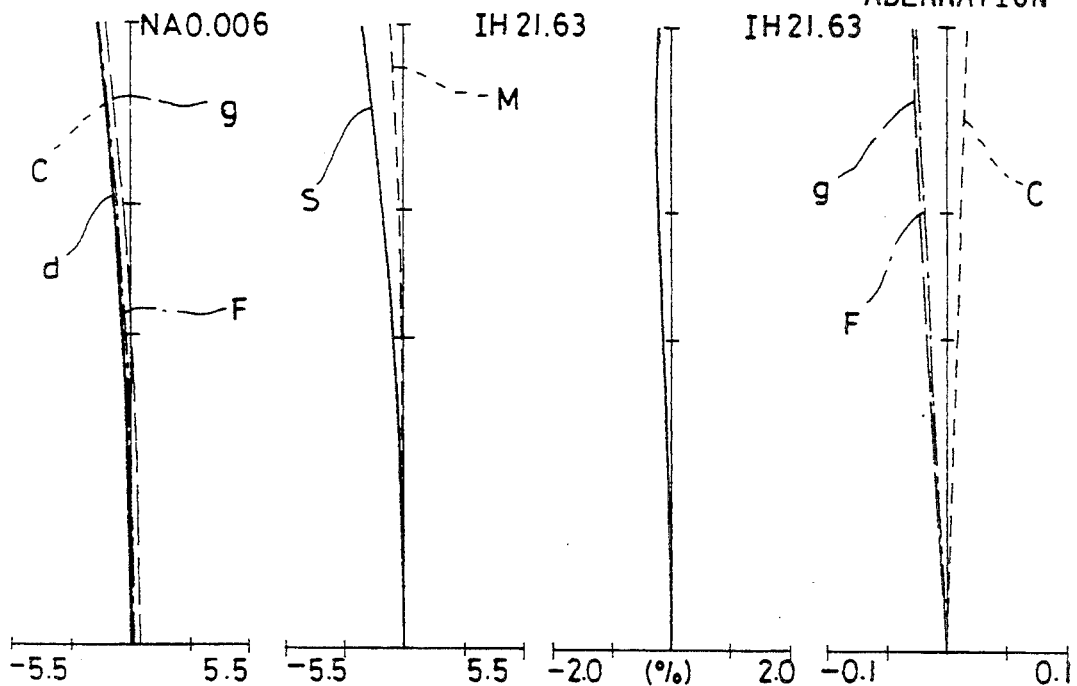
FIG. 12A SPHERICAL ABERRATION
FIG. 12B ASTIGMATISM
FIG. 12C DISTORTION
FIG. 12D LATERAL CHROMATIC ABERRATION
FIG. 12E COMA
FIG. 12F COMA
FIG. 12G COMA

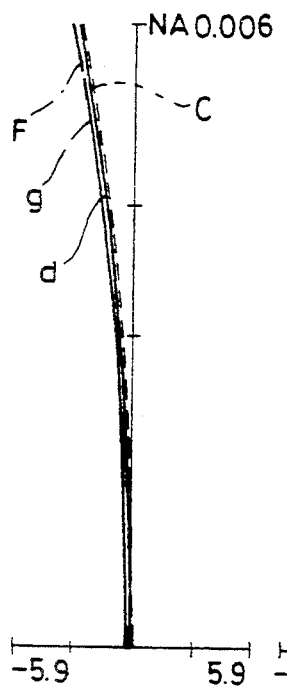
FIG. 13A
SPHERICAL ABERRATION
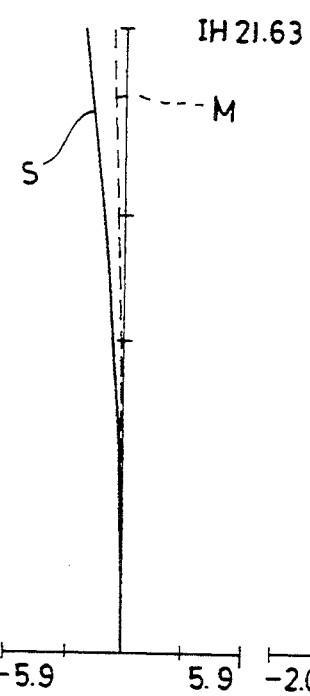
FIG. 13B
ASTIGMATISM
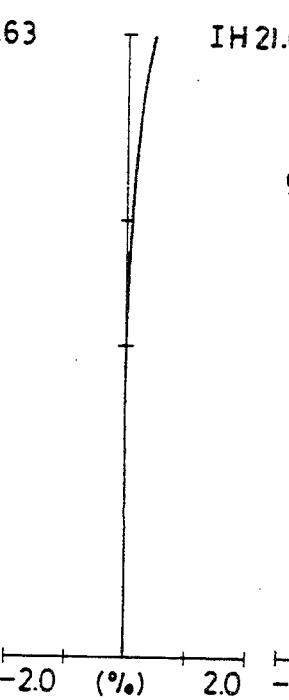
FIG. 13C
DISTORTION
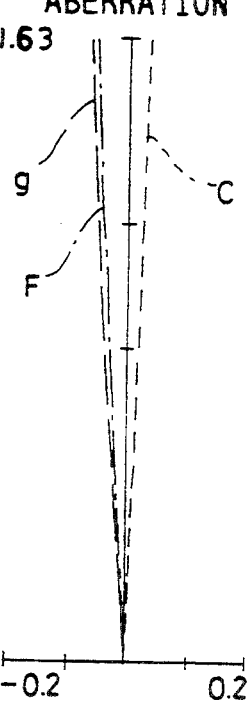
FIG. 13D
LATERAL CHROMATIC ABERRATION
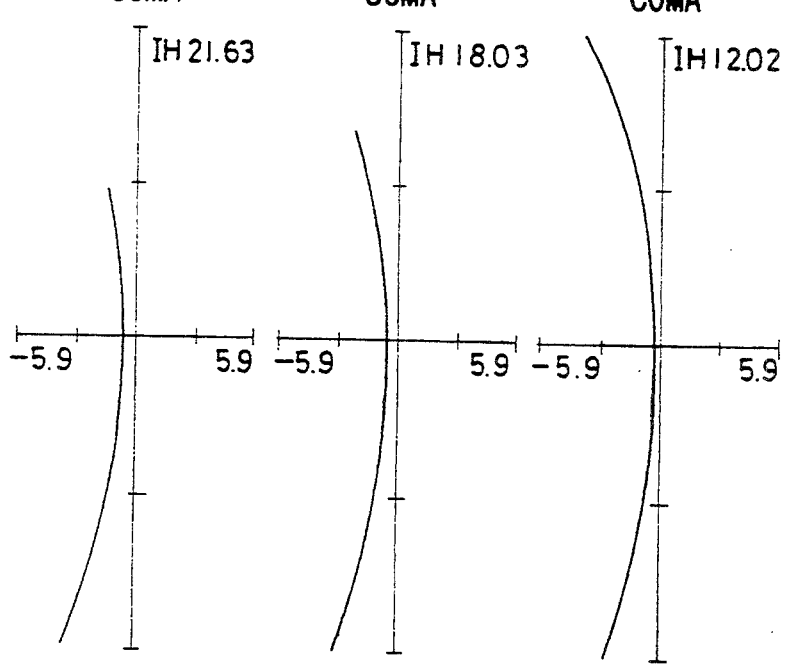
FIG. 13E
COMA
FIG. 13F
COMA
FIG. 13G
COMA

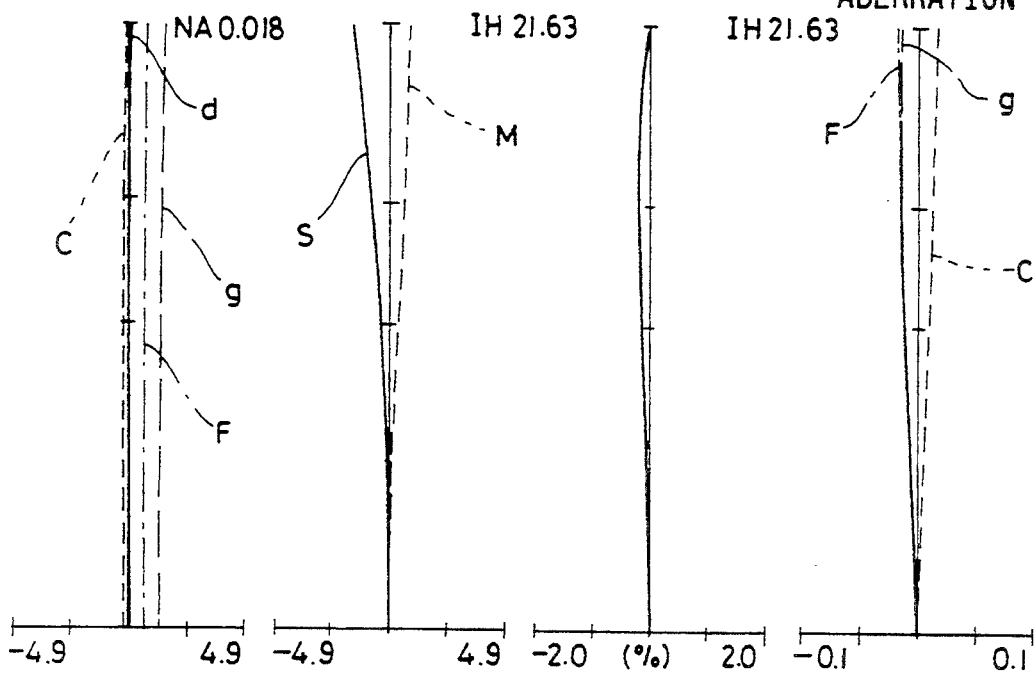

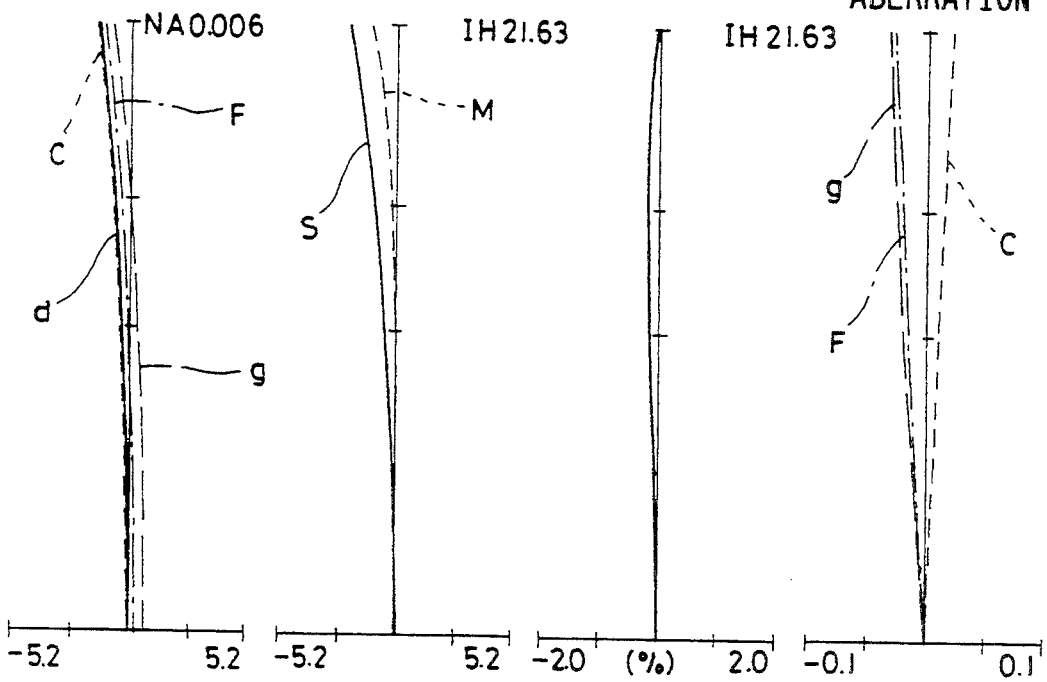

FIG. 16A
SPHERICAL ABERRATION
FIG. 16B
ASTIGMATISM
FIG. 16C
DISTORTION
FIG. 16D
LATERAL CHROMATIC ABERRATION
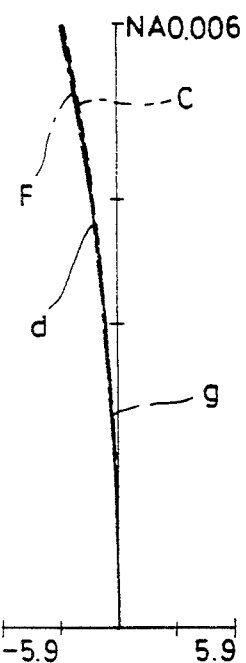
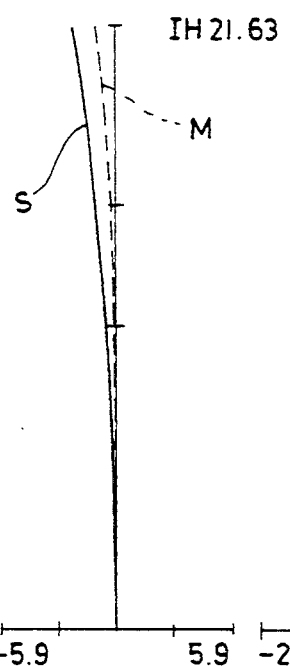
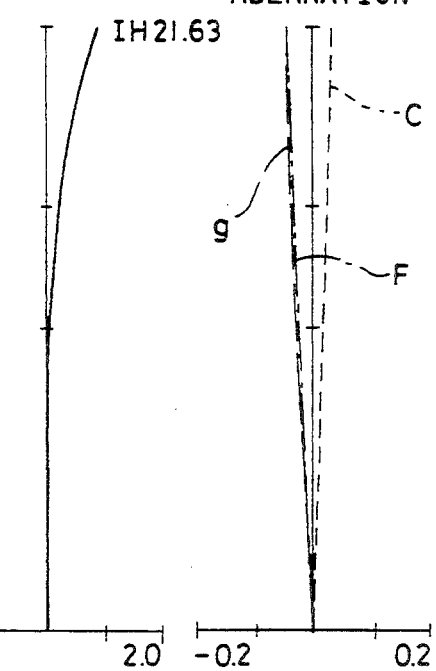
FIG. 16E
COMA
FIG. 16F
COMA
FIG. 16G
COMA
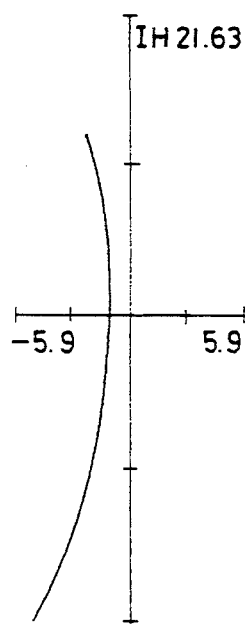
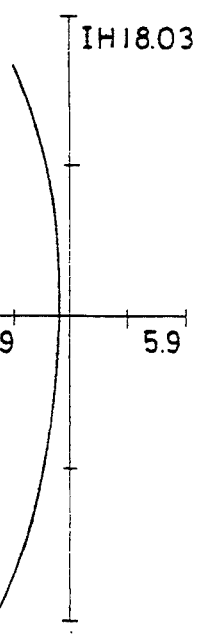
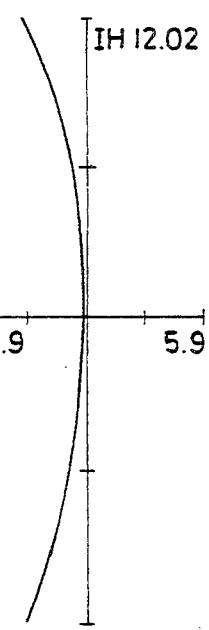

HIGH EYE POINT TYPE VIEWFINDER OPTICAL SYSTEM

BACKGROUND OF THE INVENTION a) Field of the Invention

The present invention relates to a viewfinder optical system for single-lens reflex cameras, and more specifically to a viewfinder optical system which uses an eyepiece lens system permitting adjustment of diopter.

b) Description of the Prior Art

In the recent years where single-lens reflex cameras have a large number of functions, viewfinders are used for displaying increasing numbers of information items outside visual field frames. Under this circumstance, it is considered that one of important functions of viewfinders is to permit clearly confirming not only visual fields but also the information items. However, most of the conventional viewfinders for single-lens reflex cameras cannot provide sufficiently clear appearances of marginal portions and surroundings of visual fields including the information items, and photographers, in particular those who use spectacles, strongly desire improvements of the conventional viewfinders. As a viewfinder which can solve this problem, there is known the so-called high eye point type viewfinder having a long distance (an eye relief) which is as measured from a vertex of a lens surface of an eyepiece lens system disposed on the side of an eye of a photographer to an eye point of the viewfinder optical system so that an overall range of a visual field can be observed with no eclipse even when the eye is located more or less apart from the eyepiece lens system or when the photographer uses spectacles.

On the other hand, viewfinders for single-lens reflex cameras are generally configured so as to set locations of images to be observed through eyepiece lens systems, or diopter, in the vicinity of $-1$, thereby making it difficult for long-sighted and strongly short-sighted photographers to bring the cameras into good focus and read the information items clearly. It is therefore desirable that viewfinders for single-lens reflex cameras are of the type which permits adjustment of diopter.

As a conventional example of viewfinder optical systems which permit adjustment of diopter, there is known, for example, a viewfinder optical system disclosed by Japanese Patent Kokai Publication No. Sho 54-126,530. This viewfinder optical system adopts an eyepiece lens system which consists, in order from the side of an eye of a photographer, of a positive lens component and a negative lens component, and is configured so as to permit adjustment of diopter by moving either of these lens components along an optical axis. Further, there are known, as improved versions of the viewfinder optical system described above, there are known viewfinder optical systems each of which consists of a negative lens component, a positive lens component and a negative lens component as exemplified by viewfinder optical systems disclosed by Japanese Patents Kokai Publication No. Sho 56-91,210, No. Sho 59-148,021, No. Sho 61-156,017 and No. Sho 64-81,925. Out of these viewfinder optical systems, those disclosed by Japanese Patents Kokai Publication No. Sho 59-148,021 and No. Sho 64-81,925 are known as high eye point type.

However, the conventional high eye point type viewfinder optical systems which permit adjustment of diopter have a common defect that they cannot provide clear appearances of marginal portions of visual fields.

SUMMARY OF THE INVENTION

A primary object of the present invention is to provide a high eye point type viewfinder optical system for single-lens reflex cameras which has a relatively simple composition comprising an eyepiece lens system consisting of a negative lens component, a positive lens component and a negative lens component, permits adjustment of diopter and assures a good image quality even at marginal portions of a visual field.

In order to reserve a long eye relief (IL) which is a distance as measured from an eyepiece lens system to an eye point, it is generally inevitable to enlarge a diameter of the eyepiece lens system and an effective aperture on a surface of emergence of a pentagonal prism. Since an optical path length in the pentagonal prism as measured in development thereof (a length of an optical path as measured along a reflecting optical path in the prism when it is linearly developed) is prolonged when the prism is enlarged for configuring the viewfinder optical system so as to be of the high eye point type, it is conceivable for observing an image formed on a viewfinder screen to adopt two means to prolong a focal length of the eyepiece lens system and to locate a rear focal point farther from the eyepiece lens system.

The above means to prolong a focal length of the eyepiece lens system causes a reduction of the magnification of the viewfinder optical system.

Further, in case of a viewfinder optical system which uses an eyepiece lens system consisting of a negative lens component, a positive lens component and a negative lens component such as the viewfinder optical system according to the present invention, prolonging of a focal length of the eyepiece lens system as a whole proportionally weakens a refractive power of the positive lens component adopted as a movable lens component and this lens component must be moved for a longer distance for making it possible to adjust diopter within a required range, whereby airspaces to be reserved among these lens components are widened and the viewfinder optical system is prolonged toward the eye of the photographer.

For the reason described above, the viewfinder optical system according to the present invention is configured so as to locate the rear focal point far from the eyepiece lens system.

Speaking concretely, the viewfinder optical system according to the present invention has a composition as illustrated in FIG. 1, for example, wherein an eyepiece lens system L for observing an image of an object formed on a reticle consists, in order from the side of the eye of the photographer, of a first negative lens component $L_1$, a second positive lens component $L_2$ and a third lens component $L_3$. Further, the viewfinder optical system according to the present invention comprises a pentagonal prism P and a condenser lens CL, and is configured so as to permit adjustment of diopter by moving the second lens component $L_2$ and the third lens component $L_3$ along an optical axis with the first lens component $L_1$ kept fixed in the eyepiece lens system L or by moving the second lens component $L_2$ along the optical axis with the first lens component $L_1$ and the third lens component $L_3$ kept fixed. The viewfinder optical system according to the present invention satisfies the following condition (1):

$$-0.030 < C_4 - (1/E_n P_4) < -0.015 \qquad (1)$$

wherein the reference symbol $E_n P_4$ represents a distance as measured from an entrance pupil to a fourth lens surface $r_4$ at diopter of $-1$ dioptry which is expressed in a unit of mm and the reference symbol $C_4$ designates a radius of curvature on the fourth surface $r_4$ which is expressed in a unit of $mm^{-1}$.

Generally speaking, a composition of an optical system as a whole is determined dependently on a surface having a refractive power among surfaces which are disposed in the optical system. In case of a viewfinder optical system which comprises a negative lens component, a positive lens component and a negative lens component like the viewfinder optical system according to the present invention, a location of a rear focal point is farther from an eyepiece lens system when a refractive power is imparted to a surface $r_4$ of a second lens component $L_2$ relative to a negative refractive power of a surface $r_2$ of a first lens component $L_1$ than that obtained when a refractive power is imparted to a surface $r_3$ of the second lens component $L_2$. Such a lens composition is known as the retrofocus type in the field of photographic lens systems.

Furthermore, since the location of the rear focal point can be farther from the eyepiece lens system by imparting a refractive power to a surface $r_6$ of a third lens component than that obtained by imparting the refractive power to the surface $r_4$ of the second lens component $L_2$, the retrofocus type can be composed by using the first lens component $L_1$ and the second lens component $L_2$. However, it is necessary for correcting chromatic aberration that the third lens component $L_3$ has a negative refractive power stronger than a certain definite level. When the positive refractive power of the surface $r_6$ of the third lens component $L_3$ is strengthened, it is necessary to strengthen a refractive power of a surface $r_5$, whereby it is obliged to composed the retrofocus type by using the second lens component $L_2$ and the third lens component $L_3$. In this case, the optical system composed of the first lens component $L_1$, the second lens component $L_2$ and the third lens component $L_3$ becomes asymmetric, and aberrations other than chromatic aberration are inbalanced.

In the composition of the eyepiece lens system adopted for the viewfinder optical system according to the present invention, remarkable aberrations are produced by the four lens surfaces $r_2$, $r_3$, $r_4$ and $r_5$ having the strong refractive powers, out of which the surface $r_4$ of the lens component $L_2$ located on the side of the pentagonal prism P has the strongest positive refractive power. Therefore, the lens surface $r_4$ produces the most remarkable aberrations, which must be reduced. On the other hand, there is known the concentric composition as a composition for reducing offaxial aberrations.

The viewfinder optical system according to the present invention is configured so that a principal ray is incident nearly perpendicularly onto the lens surface $r_4$ of the second lens component $L_2$ which is disposed on the side of the pentagonal prism. Speaking concretely, the radius of curvature $r_4$ on the surface of the second lens component $L_2$ located on the side of the pentagonal prism P is defined so as to satisfy the above-mentioned condition (1) for obtaining favorable performance while locating the rear focal point of the eyepiece lens system far there from in the viewfinder optical system according to the present invention.

If the lower limit of the condition (1) is exceeded, the rear focal point will be far from the eyepiece lens system, but this lens system will not be concentric and the offaxial aberrations will be aggravated. If the upper limit of the condition (1) is exceeded, in contrast, the eyepiece lens system will not be concentric and the offaxial aberrations will be aggravated similarly to the case where the lower limit of the condition (1) is exceeded. When the upper limit of the condition (1) is exceeded, the positive refractive power of the surface $r_3$ must be strengthened for maintaining the refractive power of the second lens component $L_2$ stronger than the definite level, and the retrofocus type cannot be composed of the first lens component $L_1$ and the second lens component $L_2$, as judged according to the paraxial theory, thereby making it impossible to prolong the optical path length in the pentagonal prism as measured in development thereof. As a result, the viewfinder optical system cannot be of the high eye point type or the focal length of the eyepiece lens system as a whole must be prolonged for permitting adjustment of diopter, thereby lowering a magnification of the viewfinder optical system.

In the condition (1), $1/E_n P_4$ has a value which is dependent on the length as measured from the eyepiece lens system to the eye point thereof. In other words, a desirable range of the radius of curvature on the surface of the second lens component $L_2$ which is disposed on the side of the pentagonal prism P is roughly determined by setting the eye point within a definite range.

On the other hand, marginal portions of a visual field can be observed relatively easily even by a person with spectacles so far as the distance as measured from the eyepiece lens system to the eye point is 18 mm or longer. When a viewfinder optical system having a relatively high magnification like that according to the present invention is configured so as to reserve too long a distance as measured from the eyepiece lens system to the eye point exceeding 30 mm, however, it is difficult to coincide a location of an eye of a photographer with the exit pupil, thereby constituting inconvenience for observation. It is therefore preferable for the viewfinder optical system according to the present invention to set the distance as measured from the eyepiece lens system to the eye point within a range from 18 mm to 30 mm and it is therefore desirable for this purpose to select a radius of curvature $r_4$ on the surface located on the side of the second lens component $L_2$ disposed on the side of the pentagonal prism P within a range satisfying the following condition (2):

$$-40 < r_4 < -30 \text{ (mm)} \qquad (2)$$

If the radius of curvature $r_4$ has a value large enough to exceed the upper limit of the condition (2), the rear focal point will be far from the eyepiece lens system, but the eyepiece lens system will not be concentric, thereby aggravating the offaxial aberrations. If $r_4$ has a value small enough to exceed the lower limit of the condition (2), in contrast, the eyepiece lens system will not be concentric, thereby aggravating the offaxial aberrations and the positive refractive power of the surface $r_4$ must be strengthened for maintaining the refractive power of the second lens component stronger than the definite level, whereby the offaxial aberrations will be aggravated, the paraxial refractive power distribution will not be of the retrofocus type in the eyepiece lens system and it will be impossible to prolong the optical path length in the pentagonal prism as measured in development thereof. As a result, the viewfinder optical system cannot be of the high eye point type or the eyepiece lens system must have a prolonged focal length for permitting adjustment of diopter, thereby lowering a magnification of the viewfinder optical system.

When the viewfinder optical system according to the present invention is configured so as to satisfy the condition (1) as described above, the refractive power of the second lens component $L_2$ is weakened, whereby a total refractive power $P_L$ of the lens components $L_1$, $L_2$ and $L_3$ is weakened, and the viewfinder optical system has a lowered magnification. It is therefore necessary to enhance the magnification of the viewfinder optical system by strengthening a refractive power $P_c$ of the condenser lens. That is to say, it is desirable to satisfy the following condition (3):

$$0.75 < P_c/P_L < 1.05 \tag{3}$$

wherein the reference symbol $P_L$ represents the total refractive power of the lens components $L_1$, $L_2$ and $L_3$ at a diopter of $-1$ dioptry, and the reference symbol $P_c$ designates the refractive power of the condenser lens.

If $P_c/P_L$ has a value small enough to exceed the lower limit of the condition (3), it will be difficult to maintain a high magnification of the viewfinder optical system. In addition, negative distortion will be too remarkable for correction. If $P_c/P_L$ has a value large enough to exceed the upper limit of the condition (3), it will be impossible to reserve a long optical path length in the pentagonal prism as measured in development thereof, thereby making it difficult to configure the viewfinder optical system so as to be of the high eye point type. Moreover, positive distortion will be too remarkable for correction.

As is understood from the foregoing description, it is desirable for accomplishing the objects of the present invention to configure the viewfinder optical system so as to satisfy the conditions (1) and (3) at the same time:

$$-0.030 < C_4 - (1/E_n P_4) < -0.015 \tag{1}$$

$$0.75 < P_c/P_L < 1.05 \tag{3}$$

Further, when attention is paired to correction of the offaxial aberrations out of the objects of the present invention, it is desirable to configure the viewfinder optical system according to the present invention so as to satisfy the following conditions (1) and (2) at the same time:

$$-0.030 < C_4 - (1/E_n P_4) < -0.015 \tag{1}$$

$$-40 < r_4 < -30 \text{ (mm)} \tag{2}$$

More desirably, it is preferable for favorable correction of the offaxial aberrations and enhancement of a magnification of the viewfinder optical system according to the present invention to satisfy the following conditions (1), (2) and (3) at the same time:

$$-0.030 < C_4 - (1/E_n P_4) < -0.015$$

$$-40 < r_4 < -30 \text{ (mm)} \tag{2}$$

$$0.75 < P_c/P_L < 1.05 \tag{3}$$

Furthermore, it is desirable for the viewfinder optical system according to the present invention that $P_L$ and $P_c$ have values satisfying the following conditions (4) and (5) respectively:

$$0.70 < P_c/P_T < 0.90 \tag{4}$$

$$0.95 > P_L/P_T > 0.80 \tag{5}$$

wherein the reference symbol $P_T$ represents a refractive power of the eyepiece lens system as a whole.

If $P_c/P_T$ has a value exceeding the lower limit of the condition (4) or $P_L/P_T$ has a value exceeding the upper limit of the condition (5), it will be difficult to maintain a magnification of the viewfinder optical system at a high level, and negative distortion will be remarkable and can hardly be corrected. If $P_c/P_T$ has a value exceeding the upper limit of the condition (4) or $P_L/P_T$ has a value exceeding the lower limit of the condition (5), in contrast, it will be impossible to reserve a long optical path length in the pentagonal prism as measured in development thereof, whereby it will be difficult to obtain a viewfinder optical system of the high eye point type, and positive distortion will be remarkable and can hardly be corrected.

When the radius of curvature on the surface $r_4$ of the second lens component $L_2$ used in the viewfinder optical system according to the present invention is selected so as to satisfy the above-mentioend condition (2), the second lens component $L_2$ inevitably has a weakened refractive power, but it is necessary to reserve a wide range for diopter adjustment even in such a case.

When diopter is to be varied from $-3$ dioptry to $+1$ dioptry, it is desirable that a moving distance $\Delta D_2$ of the second lens component $L_2$ is set within a range satisfying the following condition (6) for performing the variation of diopter by moving the second lens component $L_2$ with the first lens component $L_1$ and the third lens component $L_3$ kept fixed: relative to the focal plane:

$$0.0620 < \Delta D_2 \cdot P_T < 0.0680 \tag{6}$$

When the second lens component $L_2$ and the third lens component $L_3$ are to be moved with the first lens component $L_1$ kept fixed relative to the focal plane, a variation of $\Delta D_{23}$ of an airspace reserved between the second lens component $L_2$ and the third lens component $L_3$ is important, whereas a value of $\Delta D_2 P_T$ has low significance. That is to say, it is desirable to set $\Delta D_{23}$ within a range satisfying the following condition (7):

$$0.0620 < \Delta D_{23} \cdot P_T < 0.0780 \tag{7}$$

When the second lens component $L_2$ and the third lens component $L_3$ are to be moved with the first lens component $L_1$ kept fixed relative to the focal plane, a moving distance $\Delta D_2$ of the second lens component $L_2$ can be shortened by adequately moving the third lens component $L_3$.

In order to impart a refractive power as strong as possible to the second lens component $L_2$ while selecting the radius of curvature $r_4$ on the surface of the second lens component $L_2$ which is located on the side of the pentagonal prism P so as to satisfy the condition (2) mentioned above, it is conceivable to select a glass material having a high refractive index for the second lens component $L_2$. It is desirable for the purpose described above to select a glass material having a refractive index higher than 1.75, but it is difficult to select a glass material having a refractive index higher than 1.9 from among glass materials which are currently available from viewpoints of limitations imposed due to coloring of glass materials and manufacturing cost of the second lens component $L_2$. Further, an Abbe's number is limited when a glass material having a high refractive index is selected for the second lens component $L_2$. Due to this fact, it is desirable that the second lens component has an Abbe's number $\nu_{d2}$ within a range defined below:

$$30 < \nu_{d2} < 55$$

Moreover, when manufacturing cost of the second lens component $L_2$ and stability of a material as well as possibility of correction of chromatic aberration are taken into consideration, it is more desirable that the second lens component $L_2$ has an Abbe's number within a range defined below:

$$35 < \nu_{d2} < 50$$

When the second lens component $L_2$ has an Abbe's number smaller than 50 which is rather small for the positive lens component, however, it is necessary for correcting chromatic aberration within a limited space to reduce Abbe's numbers of the negative lens components. Since the third lens component $L_3$ has a refractive power which is strong as compared with that of the first lens component $L_1$ in the eyepiece lens system used in the viewfinder optical system according to the present invention, selection of an Abbe's number of the third lens component $L_3$ is important. It is desirable to select an Abbe's number $\nu_{d3}$ for the third lens component $L_3$ within a range defined by the following condition (8):

$$0.0100 < 1/\nu_{d3} - 1/\nu_{d2} < 0.02 \quad (8)$$

If the lower limit of the condition (8) is exceeded, it will be difficult to correct chromatic aberration. If the upper limit of the condition (8) is exceeded, in contrast, the eyepiece lens system will have degraded offaxial optical performance due to the limitation to refractive indices of the glass materials currently available.

In addition, not only the selection of a glass material but also dispositions of the lens components are important. In the eyepiece lens system of the viewfinder optical system according to the present invention wherein the refractive power of the first lens component $L_1$ is strong as compared with that of the third lens component $L_3$, dispositions of the second lens component $L_2$ and the third lens component $L_3$ are important. It is desirable for the eyepiece lens system to satisfy the following coondition (9):

$$0.0440 < e_{23} \cdot P_T < 0.0540 \quad (9)$$

wherein the reference symbol $e_{23}$ represents a distance as measured between a rear principal point of the second lens component $L_2$ and a front principal point of the third lens component $L_3$ at diopter of $-1$ dioptry, and the reference symbol $P_T$ designates a refractive power of the eyepiece lens system as a whole.

If $e_{23} \cdot P_T$ has a value small enough to exceed the lower limit of the condition (9), lateral chromatic aberration will be undercorrected as compared with longitudinal chromatic aberration. If $e_{23} \cdot P_T$ has a value large enough to exceed the upper limit of the condition (9), in contrast, lateral chromatic aberration will be overcorrected as compared with longitudinal chromatic aberration and curves of coma produced by rays having different wavelengths will be largely variable, whereby images will undesirably be largely deformed when observed by an eye deviated from the optical axis. Further, it will be impossible to reserve a long optical path length in the pentagonal prism as measured in development thereof, thereby making it difficult to obtain a viewfinder optical system of the high eye point type.

Furthermore, glass materials having small Abbe's numbers generally have high refractive indices. It is not so preferable for correction of curvature of field and so on to select glass materials having high refractive indices for the negative lens components, and it is effective for enhancing offaxial performance of the viewfinder optical system to use glass materials having small Abbe's numbers and low refractive indices for these lens components.

In case of a viewfinder optical system like the viewfinder optical system according to the present invention which comprises the lens components $L_1$, $L_2$ and $L_3$, examinations of aberrations coefficients of the third and fifth orders of the lens components will indicate a fact that aberrations which are produced by the surfaces $r_2$ and $r_3$ are generally corrected by the surfaces $r_3$ and $r_5$ respectively. In other words, aberrations produced by the lens surfaces are cancelled with reverse aberrations which are produced by the lens surfaces disposed immediately after the former lens surfaces, and the first through the third lens components $L_1$, $L_2$ and $L_3$ are configured so as to reduce variations of aberrations even when diopter is adjusted.

Moreover, the condenser lens CL which is disposed apart from the lens components $L_1$, $L_2$ and $L_3$ of the eyepiece lens system L functions to cancel aberrations which remain after the correction by the lens components $L_1$, $L_2$ and $L_3$ by producing reverse aberrations so that distortion is little in the viewfinder optical system as a whole.

Since aberrations produced by the surfaces $r_2$, $r_3$, $r_4$ and $r_5$ of the lens components $L_1$, $L_2$ and $L_3$ are cancelled with those produced by the surfaces which are disposed at near locations as described above for correction of the aberrations, aberrations in the eyepiece lens system consisting of the lens components $L_1$, $L_2$ and $L_3$ are determined by the other surfaces $r_1$ and $r_6$.

It is desirable that these two surfaces are configured so as to have shapes having radii of curvature satisfying the following condition (10):

$$-0.32 < (r_6 + r_1)/(r_6 - r_1) < 0.48 \quad (10)$$

wherein the reference symbol $r_1$ represents a radius of curvature on the surface of the first lens component $L_1$ which is disposed on the side of the photographer's eye and the reference symbol $r_6$ designates a radius of curvature on the surface of the third lens component $L_3$ which is disposed on the side of the pentagonal prism P.

For using a plano-concave lens component so as to produce little aberrations, it is preferable, as known to those skilled in the art, to dispose the lens component in such a direction that the lens component has a planar surface on the side of an object point or an image point whichever is nearer. The condition (10) mentioned above is required for disposing a lens component in the direction described above. If the lower limit of the condition (10) is exceeded, the lens component will be a biconvex lens component which is not disposed in the direction defined above, thereby offaxial optical performance of the viewfinder optical system will be degraded. If the upper limit of the condition (10) is exceeded, in contrast, the first through third lens components will have rear focal points which are brought to near one another, thereby making it impossible to prolong the optical path length in the petagonal prism as measured in development thereof.

In order to further enhance offaxial optical performance of the viewfinder optical system without particularly prolonging the optical path length in the pentagonal prism as measured in development thereof, it is desirable to satisfy the following condition (11):

$$0 < (r_6 + r_1)/(r_6 - r_1) < 0.48 \qquad (11)$$

In the viewfinder optical system according to the present invention, aberrations which are produced by the surfaces $r_2$, $r_3$, $r_4$ and $r_5$ of the lens components $L_1$, $L_2$ and $L_3$ are cancelled with each other for correction of aberrations in the viewfinder optical system. When remarkable aberrations are produced by the individual lens surfaces, however, aberrations of high orders are also produced in large amounts by these lens surfaces, thereby degrading optical performance of the viewfinder optical system. It is therefore desirable that each of these lens surfaces produces aberrations in reduced amounts.

When the first lens component $L_1$ to be used in the viewfinder optical system according to the present invention is configured so as to have a shape satisfying the following condition (12), the surface $r_2$ produces aberrations in reduced amounts, whereby the surfaces $r_3$, $r_4$ and $r_5$ produce aberrations in reduced amounts correspondingly:

$$-4.22 < (r_2 + r_1)/(r_2 - r_1) < -1.68 \qquad (12)$$

wherein the reference symbol $r_2$ represents a radius of curvature on the surface of the first lens component $L_1$ which is disposed on the side of the pentagonal prism P.

If $(r_2 + r_1)/(r_2 - r_1)$ has a value exceeding the lower limit of the condition (12), the rear focal points of the lens components $L_1$, $L_2$ and $L_3$ will be brought near the eyepiece lens system, thereby making it impossible to prolong the optical path length in the pentagonal prism as measured in development thereof. If the upper limit of the condition (12) is exceeded, in contrast, the surface $r_2$ will produce aberrations in increased amounts, thereby degrading the offaxial optical performance of the viewfinder optical system.

Though a Fresnel lens component is ordinarily disposed on the reticle, it is possible to strengthen a refractive power of the Fresnel lens component and omit the condenser lens when residual distortion of a certain degree is allowable.

As is understood from the foregoing description, the present invention can exhibit the effects thereof when the viewfinder optical system according to the present invention is configured so as to have a composition satisfying the conditions (1) through (12). These conditions (1) through (12) have not only independent effects but also those which are more favorable when related to one another. Accordingly, the conditions (1) through (12) are selectable dependently on effects which are required for practical use.

BRIEF DESCRIPTION OF THE DRAWINGS

FIG. 2 shows curves illustrating aberration characteristics of a first embodiment of the viewfinder optical system according to the present invention at −3 dioptry;

FIG. 3 shows curves illustrating aberration characteristics of the first embodiment of the present invention at −1 dioptry;

FIG. 4 shows graphs illustrating aberration characteristics of the first embodiment of the present invention at +1 dioptry;

FIG. 5 shows graphs illustrating aberration characteristics of a second embodiment of the viewfinder optical system according to the present invention at −3 dioptry;

FIG. 6 shows curves visualizing aberration characteristics of the second embodiment of the present invention at −1 dioptry;

FIG. 7 shows curves visualizing aberration characteristics of the second embodiment of the present invention at +1 dioptry;

FIG. 8 shows graphs visualizing aberration characteristics of a third embodiment of the viewfinder optical system according to the present invention at −3 dioptry;

FIG. 9 shows graphs visualizing aberration characteristics of the third embodiment of the present invention at −1 dioptry;

FIG. 10 shows graphs visualizing aberration characteristics of the third embodiment of the present invention at +1 dioptry;

FIG. 11 shows curves illustrating aberration characteristics of a fourth embodiment of the viewfinder optical system according to the present invention at −3 dioptry;

FIG. 12 shows curves illustrating aberration characteristics of the fourth embodiment of the present invention at −1 dioptry;

FIG. 13 shows curves illustrating aberration characteristics of the fourth embodiment of the present invention at +1 dioptry;

FIG. 14 shows graphs visualizing aberration characteristics of a fifth embodiment of the viewfinder optical system according to the present invention at −3 dioptry;

FIG. 15 shows graphs visualizing aberration characteristics of the fifth embodiment of the present invention at −1 dioptry; and FIG. 16 shows graphs visualizing aberration characteristics of the fifth embodiment of the present invention at +1 dioptry.

DETAILED DESCRIPTION OF THE PREFERRED EMBODIMENTS

Figure 1:
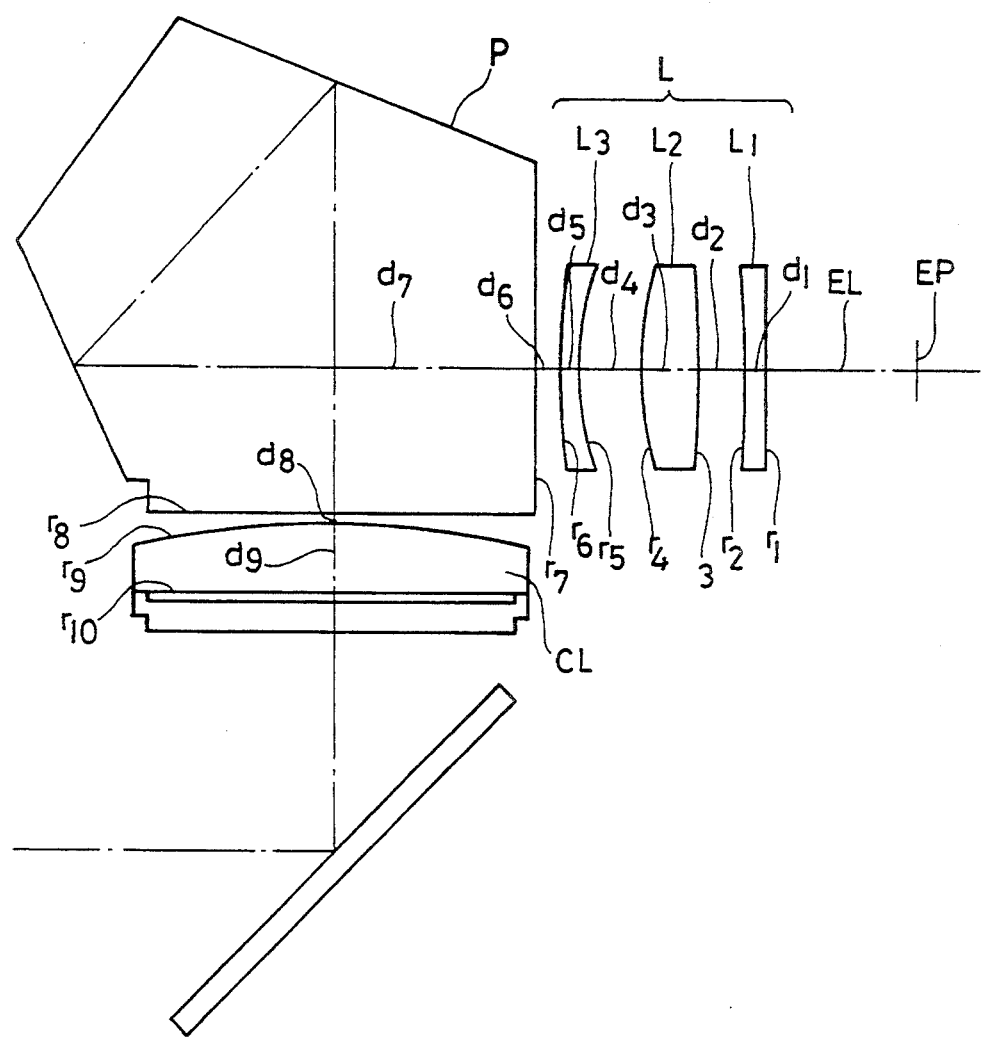
FIG. 1 shows a sectional view illustrating a composition of the viewfinder optical system according to the present invention.

Now, the high eye point type viewfinder optical system according to the present invention will be described more detailedly below with reference to the preferred embodiments which are given in the form of the following numerical data:

Embodiment 1 focal length at diopter −1 dioptry = 71.833 mm
$r_1$ = 89.106

| | | |
|---|---|---|
| $d_1 = 1.1$ | $n_1 = 1.7555$ | $v_1 = 25.1$ |
| $r_2 = 49.257$ | | |
| $d_2 = D_1$ | | |
| $r_3 = 80.004$ | | |
| $d_3 = 6.44$ | $n_2 = 1.883$ | $v_2 = 40.8$ |
| $r_4 = -35.921$ | | |
| $d_4 = D_2$ | | |
| $r_5 = -34.610$ | | |
| $d_5 = 1.1$ | $n_3 = 1.7555$ | $v_3 = 25.1$ |
| $r_6 = -201.477$ | | |
| $d_6 = 0.1$ | | |
| $r_7 = \infty$ | | |
| $d_7 = 92.000$ | $n_4 = 1.516$ | $v_4 = 65.3$ |
| $r_8 = \infty$ | | |
| $d_8 = 1.5$ | | |
| $r_9 = 64.885$ | | |
| $d_9 = 5.1$ | $n_5 = 1.6516$ | $v_5 = 58.5$ |
| $r_{10} = \infty$ | | |
| diopter | $-3$ | $-1$ | $+1$ |
| EL | 18.00 | 20.50 | 25.00 |
| $D_1$ | 6.39 | 4.09 | 1.57 |
| $D_2$ | 0.50 | 2.80 | 5.32 |

$C_4 - (1/E_n P_4) = -0.02235$, $P_c/P_L = 0.8024$,
$P_c/P_T = 0.7214$, $P_L/P_T = 0.8990$, $\Delta D_2 \cdot P_T = 0.06710$,
$\Delta D_{23} \cdot P_T = 0.06710$, $1/v_{d3} - 1/v_{d2} = 0.01533$,
$e_{23} \cdot P_T = 0.05231$
$(r_6 + r_1)/(r_6 - r_1) = 0.3867$
$(r_2 + r_1)/(r_2 - r_1) = -3.4722$ Embodiment 2 focal length at diopter $-1$ dioptry $= 71.830$ mm
$r_1 = 83.939$

| | | |
|---|---|---|
| $d_1 = 2.08$ | $n_1 = 1.7555$ | $v_1 = 25.1$ |
| $r_2 = 47.473$ | | |
| $d_2 = D_1$ | | |
| $r_3 = 74.640$ | | |
| $d_3 = 6.95$ | $n_2 = 1.883$ | $v_2 = 40.8$ |
| $r_4 = -35.143$ | | |
| $d_4 = D_2$ | | |
| $r_5 = -34.113$ | | |
| $d_5 = 1.09$ | $n_3 = 1.8052$ | $v_3 = 25.4$ |
| $r_6 = -186.512$ | | |
| $d_6 = 0.1$ | | |
| $r_7 = \infty$ | | |
| $d_7 = 91.200$ | $n_4 = 1.5163$ | $v_4 = 65.3$ |
| $r_8 = \infty$ | | |
| $d_8 = 1.5$ | | |
| $r_9 = 65.000$ | | |
| $d_9 = 5.1$ | $n_5 = 1.6516$ | $v_5 = 58.5$ |
| $r_{10} = \infty$ | | |
| diopter | $-3$ | $-1$ | $+1$ |
| EL | 18.00 | 20.50 | 25.00 |
| $D_1$ | 5.83 | 3.68 | 1.33 |
| $D_2$ | 0.38 | 2.53 | 4.88 |

$C_4 - (1/E_n P_4) = -0.02409$, $P_c/P_L = 0.8010$,
$P_c/P_T = 0.7201$, $P_L/P_T = 0.8990$, $\Delta D_2 \cdot P_T = 0.06265$,
$\Delta D_{23} \cdot P_T = 0.06265$, $1/v_{d3} - 1/v_{d2} = 0.01486$,
$e_{23} \cdot P_T = 0.05029$,
$(r_6 + r_1)/(r_6 - r_1) = 0.3793$
$(r_2 + r_1)/(r_2 - r_1) = -3.6037$ Embodiment 3 focal length at diopter $-1$ dioptry $= 73.765$ mm
$r_1 = 148.583$

| | | |
|---|---|---|
| $d_1 = 1.09$ | $n_1 = 1.8052$ | $v_1 = 25.4$ |
| $r_2 = 57.653$ | | |
| $d_2 = D_1$ | | |
| $r_3 = 77.194$ | | |
| $d_3 = 4.00$ | $n_2 = 1.883$ | $v_2 = 40.8$ |
| $r_4 = -36.637$ | | |
| $d_4 = D_2$ | | |
| $r_5 = -34.459$ | | |
| $d_5 = 1.03$ | $n_3 = 1.7555$ | $v_3 = 25.1$ |
| $r_6 = -166.801$ | | |
| $d_6 = D_3$ | | |
| $r_7 = \infty$ | | |
| $d_7 = 95.700$ | $n_4 = 1.5163$ | $v_4 = 65.3$ |
| $r_8 = \infty$ | | |
| $d_8 = 1.5$ | | |
| $r_9 = 60.000$ | | |
| $d_9 = 7.1$ | $n_5 = 1.6516$ | $v_5 = 58.5$ |
| $r_{10} = \infty$ | | |
| diopter | $-3$ | $-1$ | $+1$ |
| EL | 20.00 | 21.50 | 23.00 |
| $D_1$ | 6.07 | 4.16 | 1.28 |
| $D_2$ | 0.50 | 3.17 | 6.08 |
| $D_3$ | 1.19 | 0.43 | 0.40 |

$C_4 - (1/E_n P_4) = -0.02095$, $P_c/P_L = 0.9279$,
$P_c/P_T = 0.8011$, $P_L/P_T = 0.8633$, $\Delta D_2 \cdot P_T = 0.06494$,
$\Delta D_{23} \cdot P_T = 0.07565$, $1/v_{d3} - 1/v_{d2} = 0.01533$,
$e_{23} \cdot P_T = 0.05032$, $(r_6 + r_1)/(r_6 - r_1) = 0.0578$,
$(r_2 + r_1)/(r_2 - r_1) = -2.2681$ Embodiment 4 focal length at diopter $-1$ dioptry $= 74.286$ mm
$r_1 = 85.303$

| | | |
|---|---|---|
| $d_1 = 4.72$ | $n_1 = 1.7555$ | $v_1 = 25.1$ |
| $r_2 = 51.848$ | | |
| $d_2 = D_1$ | | |
| $r_3 = 81.694$ | | |
| $d_3 = 3.79$ | $n_2 = 1.883$ | $v_2 = 40.8$ |
| $r_4 = -36.529$ | | |
| $d_4 = D_2$ | | |
| $r_5 = -35.454$ | | |
| $d_5 = 1.09$ | $n_3 = 1.8052$ | $v_3 = 25.4$ |
| $r_6 = -218.329$ | | |
| $d_6 = 0.10$ | | |
| $r_7 = \infty$ | | |
| $d_7 = 92.800$ | $n_4 = 1.5163$ | $v_4 = 65.3$ |
| $r_8 = \infty$ | | |
| $d_8 = 1.5$ | | |
| $r_9 = 65.000$ | | |
| $d_9 = 5.1$ | $n_5 = 1.6516$ | $v_5 = 58.5$ |
| $r_{10} = \infty$ | | |
| diopter | $-3$ | $-1$ | $+1$ |
| EL | 20.00 | 21.50 | 23.00 |
| $D_1$ | 6.17 | 3.88 | 1.41 |
| $D_2$ | 0.56 | 2.85 | 5.32 |

$C_4 - (1/E_n P_4) = -0.02313$, $P_c/P_L = 0.8317$,
$P_c/P_T = 0.7447$, $P_L/P_T = 0.8953$, $\Delta D_2 \cdot P_T = 0.06408$,
$\Delta D_{23} \cdot P_T = 0.06408$, $1/v_{d3} - 1/v_{d2} = 0.01486$,
$e_{23} \cdot P_T = 0.04529$
$(r_6 + r_1)/(r_6 - r_1) = 0.4381$
$(r_2 + r_1)/(r_2 - r_1) = -4.0996$ Embodiment 5 focal length at diopter $-1$ dioptry $= 71.830$ mm
$r_1 = 236.904$

| | | |
|---|---|---|
| $d_1 = 1.06$ | $n_1 = 1.7472$ | $v_1 = 25.7$ |
| $r_2 = 67.553$ | | |
| $d_2 = D_1$ | | |
| $r_3 = 74.239$ | | |
| $d_3 = 3.91$ | $n_2 = 1.883$ | $v_2 = 40.8$ |
| $r_4 = -36.314$ | | |
| $d_4 = D_2$ | | |
| $r_5 = -33.210$ | | |
| $d_5 = 1.09$ | $n_3 = 1.8052$ | $v_3 = 25.4$ |
| $r_6 = -133.742$ | | |
| $d_6 = D_3$ | | |
| $r_7 = \infty$ | | |
| $d_7 = 92$ | $n_4 = 1.5163$ | $v_4 = 65.3$ |
| $r_8 = \infty$ | | |
| $d_8 = 1.5$ | | |
| $r_9 = 55.000$ | | |
| $d_9 = 7.1$ | $n_5 = 1.6516$ | $v_5 = 58.5$ |
| $r_{10} = \infty$ | | |
| diopter | $-3$ | $-1$ | $+1$ |
| EL | 20.00 | 21.50 | 23.00 |
| $D_1$ | 3.91 | 3.14 | 0.50 |
| $D_2$ | 0.50 | 3.25 | 6.02 |
| $D_3$ | 2.44 | 0.46 | 0.33 |

$C_4 - (1/E_n P_4) = -0.02046$, $P_c/P_L = 0.9755$,
$P_c/P_T = 0.8472$, $P_L/P_T = 0.8685$, $\Delta D_2 \cdot P_T = 0.04769$,
$\Delta D_{23} \cdot P_T = 0.07719$, $1/v_{d3} - 1/v_{d2} = 0.01486$,
$e_{23} \cdot P_T = 0.05235$
$(r_6 + r_1)/(r_6 - r_1) = -0.2783$
$(r_2 + r_1)/(r_2 - r_1) = -1.7978$ wherein the reference symbols $r_1, r_2, \ldots$ through $r_{10}$ represent radii of curvature on surfaces of the respective lens components, the reference symbols $d_1, d_2, \ldots$ through $d_9$ designate airspaces reserved among the respective lens components, the reference symbols $n_1$, $n_2$, ... through $n_5$ denote refractive indices of the respective lens components, and the reference symbols $\nu_1$, $\nu_2$, ... through $\nu_5$ represent Abbe's numbers of the respective lens components and a prism.

Each of the embodiments described above has a composition illustrated in FIG. 1. Each of these embodiments has the best composition of the viewfinder optical system according to the present invention and therefore satisfies all of the conditions (1) through (12). However, it is not always necessary, dependently on purpose of application, to satisfy all of the conditions (1) through (12) and a viewfinder optical system which satisfies some of these condition can accomplish the objects of the present invention.

The first embodiment is configured so as to reserve a distance as measured from a pentagonal prism to an eye point which is prolonged by thickening the second lens component $L_2$. This distance must be prolonged due to restrictions imposed on structures of cameras. The embodiment 1 satisfies this requirement.

In the second embodiment, the third lens component $L_3$ having the negative refractive power is made of a glass material which is different from that used in the first embodiment. Further, not only the second lens component $L_2$ but also the third lens component $L_3$ is thickened for prolonging a distance as measured from a surface of emergence of a pentagonal prism to an eye point.

In the third embodiment, the first lens component $L_1$ having the negative refractive power is made of a glass material which is different from that used in the first embodiment. The third embodiment is an example wherein two lens components are movable. Further, an optical path length in a pentagonal prism as measured in development thereof is prolonged for preventing information items and ghost from being displayed within a visual field. Moreover, the third embodiment has an eye relief which is longer than that of the first embodiment or the second embodiment.

In the fourth embodiment, the first lens component $L_1$ and the third lens component $L_3$ are made of glass materials which are different from those used in the third embodiment. Further, the fourth embodiment has, like the third embodiment, an eye relief which is longer than that of the first embodiment or the second embodiment.

In the fifth embodiment, the first lens component $L_1$ and the third lens component $L_3$ are made of glass materials which are different from those selected for the first embodiment. The fifth embodiment adopts two movable lens components, thereby allowing the second lens component $L_2$ to be moved for a distance which is shorter than the moving distance of the second lens component $L_2$ selected in any one of the embodiments each adopting a single movable lens component.

As explained in the above, the high eye point type viewfinder optical system according to the present invention can realize an excellent image performance. The viewfinder optical system has an eyepiece lens system permitting adjustment of diopter and it is best suited to be used for single lens reflex camera.

I claim:

1. A high eye point type viewfinder optical system comprising: an eyepiece lens system for observing an image of an object formed on a reticle, and a pentagonal prism and a condenser lens which are disposed between said reticle and said eyepiece lens system in order from the side of said eyepiece lens system; wherein said eyepiece lens system consists, in order from the side of an eye of a photographer, of a first negative lens component, a second positive lens component and a third negative lens component, wherein said viewfinder optical system permits adjustment of diopter by moving said second lens component along an optical axis with said first lens component and said third lens component kept fixed, and wherein said viewfinder optical system satisfies the following conditions (1) and (3):

$$-0.030 < C_4 - (1/E_n P_4) < -0.015 \tag{1}$$

$$0.75 < P_c/P_L < 1.05 \tag{3}$$

wherein the reference symbol $E_n P_4$ represents a distance as measured in a unit of millimetre at diopter of $-1$ dioptry from a surface of said second lens component which is located on the side of said pentagonal prism to an entrance pupil of said eyepiece lens system, the reference symbol $C_4$ designates curvature as measured in a unit of $mm^{-1}$ on a surface of said second lens component which is located on the side of said pentagonal prism, the reference symbol $P_c$ denotes a refractive power of said condenser lens, and the reference symbol $P_L$ represents a total refractive power of said first lens component and said second lens component as measured at diopter of $-1$ dioptry of the viewfinder optical system as a whole.

2. A high eye point type viewfinder optical system according to claim 1 further satisfying the following condition (2):

$$-40 < r_4 < -30 \tag{2}$$

wherein the reference symbol $r_4$ represents a radius of curvature on a surface of said second lens component which is located on the side of said pentagonal prism.

3. A high eye point type viewfinder optical system according to claim 2 satisfying the following conditions (4) and (5):

$$0.70 < P_c/P_T < 0.90 \tag{4}$$

$$0.95 > P_L/P_T > 0.80 \tag{5}$$

wherein the reference symbol $P_T$ represents a refractive power of said eyepiece lens system as a whole.

4. A high eye point type viewfinder optical system according to claim 3 further satisfying the following condition (6):

$$0.0620 < \Delta D_2 \cdot P_T < 0.0680 \tag{6}$$

wherein the reference symbol $\Delta D_2$ represents a moving distance of said second lens component.

5. A high eye point type viewfinder optical system according to claim 4 wherein said second lens component and said third lens component satisfy the following condition:

$$0.0100 < 1/\nu_{d3} - 1/\nu_{d2} < 0.02 \tag{18}$$

wherein the reference symbol $\nu_{d3}$ represents an Abbe's number of said third lens component.

6. A high eye point type viewfinder optical system comprising: an eyepiece lens system for observing an image of an object formed on a reticle, and a pentagonal prism and a condenser lens which are disposed between said reticle and said eyepiece lens system in order from the side of said eyepiece lens system; wherein said eyepiece lens system consists, in order from an eye of a photographer, of a first negative lens component, a second positive lens component and a third negative lens component, wherein said viewfinder optical system permits adjustment of diopter by moving said second lens component along an optical axis with said first lens component and said third lens component kept fixed, and wherein said viewfinder optical system satisfies the following conditions (1) and (2):

$$-0.030 < i\ C_4 - (1/E_nP_4) < -0.015 \quad (1)$$

$$-40 < r_4 < -30 \quad (2)$$

wherein the reference symbol $E_nP_4$ represents a distance as measured in a unit of mm at diopter of $-1$ dioptry from a surface of said second lens component which is located on the side of said pentagonal prism to an entrance pupil of said eyepiece lens system, the reference symbol $C_4$ designates curvature as measured in a unit of $mm^{-1}$ on a surface of said second lens unit which is located on the side of said pentagonal prism and the reference symbol $r_4$ denotes a radius of curvature on a surface of said second lens component which is located on the side of said pentagonal prism.

7. An high eye point type viewfinder optical system according to claim 6 further satisfying the following condition (3):

$$0.75 < P_c/P_L < 1.05 \quad (3)$$

wherein the reference symbol $P_c$ represents a refractive power of said condenser lens, and the reference symbol $P_L$ designates a total refractive power of said first, second and third lens components at diopter of $-1$ dioptry of said viewfinder optical system as a whole.

8. A high eye point type viewfinder optical system according to claim 7 satisfying the following conditions (4) and (5):

$$0.70\ 21\ P_c/P_T < 0.90 \quad (4)$$

$$0.95 > P_L/P_T > 0.80 \quad (5)$$

wherein the reference symbol $P_T$ represents a refractive power of said eyepiece lens system as a whole.

9. A high eye point type viewfinder optical system according to claim 8 further satisfying the following condition (6):

$$(0.0620 < \Delta D_2 \cdot P_T < 0.0680 \quad (6)$$

wherein the reference symbol $\Delta D_2$ represents a moving distance of said second lens component.

10. A high eye point type viewfinder optical system according to claim 9 wherein a distance $e_{23}$ as measured from a rear principal point of said second lens component to a front principal point of said third lens component satisfies the following condition (9):

$$0.0440 < e_{23} \cdot P_T < 0.0540 \quad (9)$$

11. A high eye point type viewfinder optical system comprising: an eyepiece lens system for observing an image of an object formed on a reticle, and a pentagonal prism and a condenser lens which are disposed between said reticle and said eyepiece lens system in order from the side of said eyepiece lens system; wherein said eyepiece lens system consists, in order from an eye of a photographer, of a first negative lens component, a second positive lens component and a third negative lens component, wherein said viewfinder optical system permits adjustment of diopter by moving said second lens component and said third lens component along an optical axis with said first lens component kept fixed, and wherein said viewfinder optical system satisfies the following conditions (1) and (3):

$$-0.030 < C_4 - (1/E_nP_4) < -0.015 \quad (1)$$

$$0.75 < P_c/P_L < 1.05 \quad (3)$$

wherein the reference symbol $E_nP_4$ represents a distance as measured in a unit of millimeter at diopter of $-1$ dioptry from a surface of said second lens component which is located on the side of said pentagonal prism to an entrance pupil of said eyepiece lens system, the reference symbol $C_4$ designates curvature as measured in a unit of $mm^{-1}$ on a surface of said second lens component which is located on the side of said pentagonal prism, the reference symbol $P_c$ denotes a refractive power of said condenser lens, and the reference symbol $P_L$ represents a total refractive power of said first lens component and said second lens component as measured at diopter of $-1$ dioptry of the viewfinder optical system as a whole.

12. A high eye point type viewfinder optical system according to claim 1 further satisfying the following condition (2):

$$-40 < r_4 < -30 \quad (2)$$

wherein the reference symbol $r_4$ represents a radius of curvature on a surface of said second lens component which is located on the side of said pentagonal prism.

13. A high eye point type viewfinder optical system according to claim 12 satisfying the following conditions (4) and (5):

$$0.70 < P_c/P_T < 0.90 \quad (4)$$

$$0.95 > P_L/P_T > 0.80 \quad (5)$$

wherein the reference symbol $P_T$ represents a refractive power of said eyepiece lens system as a whole.

14. A high eye point type viewfinder optical system according to claim 13 further satisfying the following condition (7):

$$0.0620 < \Delta D_{23} \cdot P_T < 0.0780 \quad (7)$$

wherein the reference symbol $\Delta D_{23}$ represents an amount of variation of an airspace reserved between said second lens component and said third lens component.

15. A high eye point type viewfinder optical system according to claim 14 satisfying the following condition (10):

$$-0.32 < (r_6 + r_1)/(r_6 - r_1) < 0.48 \quad (10)$$

wherein the reference symbol $r_1$ represents a radius of curvature on a surface of said first lens component which is disposed on the side of the eye of the photographer and the reference symbol $r_6$ designates a radius of curvature on a surface of said third lens component which is disposed on the side of said pentagonal prism.

16. A high eye point type viewfinder optical system according to claim 14 satisfying the following condition (11):

$$0 < (r_6 + r_1)/(r_6 - r_1) < 0.48 \quad (11)$$

wherein the reference symbol $r_1$ represents a radius of curvature on a surface of said first lens component which is disposed on the side of the eye of the photographer and the reference symbol $r_6$ designates a radius of curvature on a surface of said third lens component which is disposed on the side of said pentagonal prism.

17. A high eye point type viewfinder optical system comprising: an eyepiece lens system for observing an image of an object formed on a reticle, and a pentagonal prism and a condenser lens which are disposed between said reticle and said eyepiece lens system in order from said eyepiece lens system; wherein said eyepiece lens system consists, in order from an eye of a photographer, of a first negative lens component, a second positive lens component and a third negative lens component, wherein said viewfinder optical system permits adjustment of diopter by moving said second lens component and said third lens component along an optical axis with said first lens component kept fixed, and wherein said viewfinder optical system satisfies the following conditions (1) and (2):

$$-0.030 < C_4 - (1/E_n P_4) < -0.015 \quad (1)$$

$$-40 < r_4 < -30 \quad (2)$$

wherein the reference symbol $E_n P_4$ represents a distance as measured in a unit of mm at diopter of $-1$ dioptry from a surface of said second lens component which is located on the side of said pentagonal prism to an entrance pupil of said eyepiece lens system, the reference symbol $C_4$ designates curvature as measured in a unit of mm$^{-1}$ on a surface of said second lens unit which is located on the side of said pentagonal prism and the reference symbol $r_4$ denotes a radius of curvature on a surface of said second lens component which is located on the side of said pentagonal prism.

18. An high eye point type viewfinder optical system according to claim 17 further satisfying the following condition (3):

$$0.75 < P_c/P_L < 1.05 \quad (3)$$

wherein the reference symbol $P_c$ represents a refractive power of said condenser lens, and the reference symbol $P_L$ designates a total refractive power of said first, second and third lens components at diopter of $-1$ dioptry of said viewfinder optical system as a whole.

19. A high eye point type viewfinder optical system according to claim 18 satisfying the following conditions (4) and (5):

$$0.70 < P_c/P_T < 0.90 \quad (4)$$

$$0.95 > P_L/P_T > 0.80 \quad (5)$$

wherein the reference symbol $P_T$ represents a refractive power of said eyepiece lens system as a whole.

20. A high eye point type viewfinder optical system according to claim 19 further satisfying the following condition (7):

$$0.0620 < \Delta D_{23} \cdot P_T < 0.0780 \quad (7)$$

wherein the reference symbol $\Delta D_{23}$ represents an amount of variation of an airspace reserved between said second lens component and said third lens component.

21. A high eye point type viewfinder optical system according to claim 4, 9, 14 or 20 wherein said second lens component satisfies the following condition:

$$30 < \nu_{d2} < 55$$

wherein the reference symbol $\nu_{d2}$ represents an Abbe's number of said second lens component.

22. A high eye point type viewfinder optical system according to claim 4, 9, 14 or 20 wherein said second lens component satisfies the following condition:

$$35 < \nu_{d2} < 50$$

wherein the reference symbol $\nu_{d2}$ represents an Abbe's number of said second lens component.

23. A high eye point type viewfinder optical system according to claim 4, 9, 14 or 20 wherein said first lens component satisfies the following condition (12):

$$-4.22 < (r_2 + r_1)/(r_2 - r_1) < -1.68 \quad (12)$$

wherein the reference symbol $r_2$ represents a radius of curvature on a surface of said first lens component which is disposed on the side of said pentagonal prism.

* * * * *